(12) United States Patent
Chang et al.

(10) Patent No.: US 8,671,423 B1
(45) Date of Patent: Mar. 11, 2014

(54) METHOD FOR MONITORING AND CONTROLLING VIEWING PREFERENCES OF A USER

(75) Inventors: Jack H. Chang, Saratoga, CA (US); William H. Sheu, Fremont, CA (US); Sherman Tuan, Cupertino, CA (US)

(73) Assignee: PurpleComm Inc., Santa Clara, CA (US)

( * ) Notice: Subject to any disclaimer, the term of this patent is extended or adjusted under 35 U.S.C. 154(b) by 857 days.

(21) Appl. No.: 12/795,396

(22) Filed: Jun. 7, 2010

(51) Int. Cl.
*H04N 7/16* (2011.01)

(52) U.S. Cl.
USPC ............................... 725/29; 725/32; 705/14.4

(58) Field of Classification Search
USPC ...................... 725/32, 34, 9; 705/14.4, 14.49, 705/14.52–14.55, 14.61, 14.66–14.69
See application file for complete search history.

(56) References Cited

U.S. PATENT DOCUMENTS

| | | | |
|---|---|---|---|
| 6,698,020 B1 * | 2/2004 | Zigmond et al. ................ | 725/34 |
| 7,089,579 B1 | 8/2006 | Mao et al. | |
| 7,225,456 B2 | 5/2007 | Kitsukawa et al. | |
| 7,844,985 B2 * | 11/2010 | Hendricks et al. .............. | 725/35 |
| 2002/0129368 A1 * | 9/2002 | Schlack et al. .................. | 725/46 |
| 2002/0138831 A1 * | 9/2002 | Wachtfogel et al. ............ | 725/32 |
| 2002/0184634 A1 | 12/2002 | Cooper | |
| 2002/0194595 A1 * | 12/2002 | Miller et al. .................... | 725/36 |
| 2003/0110503 A1 | 6/2003 | Perkes | |
| 2003/0154475 A1 * | 8/2003 | Rodriguez et al. .............. | 725/32 |
| 2003/0172376 A1 * | 9/2003 | Coffin, III ....................... | 725/22 |
| 2003/0221197 A1 | 11/2003 | Fries et al. | |
| 2004/0025174 A1 * | 2/2004 | Cerrato ............................ | 725/9 |
| 2005/0081244 A1 | 4/2005 | Barrett et al. | |
| 2005/0177861 A1 * | 8/2005 | Ma et al. ........................ | 725/135 |
| 2006/0075428 A1 | 4/2006 | Farmer et al. | |
| 2006/0293955 A1 * | 12/2006 | Wilson et al. ................... | 705/14 |
| 2007/0277219 A1 | 11/2007 | Toebes et al. | |
| 2007/0280215 A1 * | 12/2007 | Gilbert et al. ................. | 370/356 |
| 2008/0022320 A1 | 1/2008 | Ver Steeg | |
| 2008/0098420 A1 * | 4/2008 | Khivesara et al. .............. | 725/32 |
| 2008/0115182 A1 | 5/2008 | Van Willigenburg | |
| 2009/0158363 A1 * | 6/2009 | Rodriguez et al. ............ | 725/100 |
| 2011/0047567 A1 * | 2/2011 | Zigmond et al. ................ | 725/32 |

FOREIGN PATENT DOCUMENTS

WO     WO2006041784 A2     4/2006

* cited by examiner

*Primary Examiner* — Brian Pendleton
*Assistant Examiner* — Alan Luong
(74) *Attorney, Agent, or Firm* — Fish & Richardson P.C.

(57) ABSTRACT

Media system control and advertisement technology, in which input related to advertising preferences of a user of a media system that is connected to a content delivery network is received. An advertisement control policy is defined for the user of the media system based on the received input. During viewing, on the media system, of a channel provided by the content delivery network, the media system is controlled to deliver advertisements based on the defined advertisement policy.

27 Claims, 20 Drawing Sheets

METHOD FOR MONITORING AND CONTROLLING VIEWING PREFERENCES OF A USER

FIELD

The present disclosure generally relates to media system control and advertisement technology.

BACKGROUND

Content viewers today are exposed to an overwhelming amount of information and are challenged by the degree of interaction and personalization needed to manage this massive amount of information. In an era of digital communications, a user may be confused by an array of technology including traditional analog televisions, DVRs (Digital Video Recorders), PVRs (Personal Video Recorders), media centers, EPG (Electronic Program Guide)-based systems, Internet-related content, and traditional remote control devices.

SUMMARY

A method includes receiving input related to advertising preferences of a user of a media system that is connected to a content delivery network and defining an advertisement control policy for the user of the media system based on the received input. The method also includes, during viewing, on the media system, of a channel provided by the content delivery network, controlling the media system to deliver advertisements based on the defined advertisement policy.

Implementations may include one or more of the following features. For example, the method may include displaying channel information for advertisement channels made available on the content delivery network and receiving, from the user of the media system, selection of a subset of the displayed advertisement channels made available on the content delivery network. In this example, the method may include defining an advertisement control policy based on the user-selected subset of advertisement channels and, when advertising content is needed on the media system, controlling the media system to deliver advertisements from the user-selected subset of advertisement channels.

In some implementations, the method may include receiving input identifying a percentage allocation for each advertisement channel included in the user-selected subset of advertisement channels. The percentage allocation may define a percentage of time the corresponding advertisement channel is used to deliver advertisements. In these implementations, the method may include defining an advertisement control policy based on the percentage allocation for each advertisement channel included in the user-selected subset of advertisement channels and controlling the media system to deliver advertisements from the user-selected subset of advertisement channels in accordance with the percentage allocation for each advertisement channel included in the user-selected subset of advertisement channels.

In some examples, the method may include accessing at least one of targeting data related to preferred advertisement selection for the user of the media system and media system behavior analytics data for the user of the media system and automatically identifying, without intervention of the user of the media system, an advertisement channel for the user of the media system based on at least one of the targeting data and the media system behavior analytics data. In these examples, the method may include defining an advertisement control policy based on the identified advertisement channel and, when advertising content is needed on the media system, controlling the media system to deliver advertisements from the identified advertisement channel.

In addition, the method may include accessing targeting data related to preferred advertisement selection for the user of the media system and automatically identifying the advertisement channel for the user of the media system based on the targeting data. The method also may include accessing media system behavior analytics data for the user of the media system and automatically identifying the advertisement channel for the user of the media system based on the media system behavior analytics data. The method further may include accessing advertisement behavior analytics data for the user of the media system and automatically identifying an advertisement to display to the user of the media system based on the advertisement behavior analytics data. The advertisement behavior analytics data may describe advertisement viewing behavior of the user of the media system and remote control activity of the user of the media system during display of advertisements.

Also, the method may include automatically selecting, without intervention of the user of the media system and from among multiple, different advertisement channels made available on the content delivery network, an advertisement channel for the user of the media system based on at least one of the targeting data and the media system behavior analytics data. The method further may include identifying advertisements for the user of the media system based on at least one of the targeting data and the media system behavior analytics and defining a user-specific advertisement channel for the user of the media system that includes the advertisements identified based on at least one of the targeting data and the media system behavior analytics.

In some implementations, the method may include receiving input related to advertising delivery preferences of the user of the media system and determining one or more rules for controlling advertisement delivery based on the advertising delivery preferences. In these implementations, the method may include defining an advertisement control policy based on the one or more advertisement delivery rules and controlling the media system to deliver advertisements based on the one or more advertisement delivery rules.

The method may include receiving a selection, from among options (1) to repeatedly receive an advertisement after a particular period of time of content viewing on the media system, (2) to repeatedly receive an advertisement upon change of a channel being output by the media system, and (3) to repeatedly receive an advertisement upon change of a content file being output by the media system. The method also may include determining a rule to repeatedly deliver an advertisement after a particular period of time of content viewing on the media system, monitoring for completion of the particular period of time of content viewing on the media system, and repeatedly delivering an advertisement upon detecting completion of the particular period of time of content viewing on the media system.

In some examples, the method may include receiving a selection, from among options (1) to repeatedly receive an advertisement after a particular period of time of content viewing on the media system, (2) to repeatedly receive an advertisement upon change of a channel being output by the media system, and (3) to repeatedly receive an advertisement upon change of a content file being output by the media system. In these examples, the method may include determining a rule to repeatedly deliver an advertisement upon change of a channel being output by the media system, monitoring for change of a channel being output by the media system, and repeatedly delivering an advertisement upon detecting change of a channel being output by the media system.

In some implementations, the method may include receiving a selection, from among options (1) to repeatedly receive an advertisement after a particular period of time of content viewing on the media system, (2) to repeatedly receive an advertisement upon change of a channel being output by the media system, and (3) to repeatedly receive an advertisement upon change of a content file being output by the media system. In these implementations, the method may include determining a rule to repeatedly deliver an advertisement upon change of a content file being output by the media system, monitoring for change of a content file being output by the media system, and repeatedly delivering an advertisement upon detecting change of a content file being output by the media system.

In addition, the method may include receiving input defining whether advertisements should be output on a primary output device of the media system, output on an output device of a remote control of the media system, or output on both the primary output device of the media system and the output device of the remote control of the media system. The method also may include determining a first rule to output advertisements on the primary output device of the media system in response to receiving input defining that advertisements should be output on the primary output device of the media system, determining a second rule to output advertisements on the output device of the remote control of the media system in response to receiving input defining that advertisements should be output on the output device of the remote control of the media system, and determining a third rule to output advertisements on both the primary output device of the media system and the output device of the remote control of the media system in response to receiving input defining that advertisements should be output on both the primary output device of the media system and the output device of the remote control of the media system. The method further may include controlling the media system to deliver advertisements using the primary output device of the media system in response to determining the first rule, controlling the media system to deliver advertisements using the output device of the remote control of the media system in response to determining the second rule, and controlling the media system to deliver advertisements using both the primary output device of the media system and the output device of the remote control of the media system in response to determining the third rule.

In some examples, the method may include determining a mandatory advertisement viewing period, controlling the media system to output advertisements during the mandatory advertisement viewing period, and controlling the media system to lock other functions of the media system during the mandatory advertisement viewing period. In these examples, the method may include enabling the user of the media system to perform other functions of the media system or continue receiving advertisements after completion of the mandatory advertisement viewing period.

Also, the method may include detecting that the mandatory advertisement viewing period has completed and, in response to detecting that the mandatory advertisement viewing period has completed, outputting an indication that the mandatory advertisement viewing period has completed while continuing to output advertisements and enabling the user of the media system to provide input to return to viewing, on the media system, the channel provided by the content delivery network. The method further may include detecting that the mandatory advertisement viewing period will complete within a particular amount of time and, in response to detecting that the mandatory advertisement viewing period will complete within the particular amount of time, outputting an indication that the mandatory advertisement viewing period will complete within the particular amount of time while continuing to output advertisements and enabling the user of the media system to provide input to continue receiving advertisements after completion of the mandatory advertisement viewing period. When input is received to continue receiving advertisements prior to completion of the mandatory advertisement viewing period, output of advertisements may be continued without automatically returning to the channel provided by the content delivery network at the completion of the mandatory advertisement viewing period. When input is not received to continue receiving advertisements prior to completion of the mandatory advertisement viewing period, the channel provided by the content delivery network may be returned to at the completion of the mandatory advertisement viewing period automatically, without intervention of the user of the media system.

In some implementations, the method may include selecting advertising content to present on a remote control device that is included in the media system and that controls a media device included in the media system, sending the selected advertising content to the remote control device, and displaying the selected advertising content on a display of the remote control device without impacting display of content output by the media device controlled by the remote control device. In these implementations, the method may include selecting an advertisement to present on the remote control device based on content concurrently being output by the media device controlled by the remote control device. Further, in these implementations, the method may include receiving user input interacting with the advertising content displayed on the remote control device and performing one or more operations based on the user input interacting with the advertising content displayed on the remote control device.

In some examples, the method may include controlling a voice over internet protocol module included in a remote control device to establish a telephone call based on an advertisement being delivered by the media system. The remote control device may be included in the media system and may be configured to control a media device included in the media system. In these examples, the method may include controlling the voice over internet protocol module included in the remote control device to place a telephone call to a representative of a company that provided the advertisement being delivered by the media system. Additionally, in these examples, the method may include controlling the voice over internet protocol module included in the remote control device to receive a telephone call from a representative of a company that provided the advertisement being delivered by the media system.

Further, the method may include maintaining an expiration attribute for an advertisement eligible for delivery by the media system. The expiration attribute may define a time when the advertisement expires and is no longer eligible for delivery by the media system. The method also may include determining that the advertisement has expired based on the expiration attribute and, in response to determining that the advertisement has expired, preventing the advertisement from being served by the media system and causing deletion of the advertisement from electronic storage included in the media system to the extent the advertisement has been stored in electronic storage included in the media system.

The method may include causing an advertisement to be streamed to the media system. The method also may include causing an advertisement to be pre-downloaded to electronic storage of the media system in advance of a time when the advertisement is to be presented and, at the time when the advertisement is to be presented, presenting the advertisement pre-downloaded to electronic storage of the media system.

In another aspect, a system includes at least one computer and at least one computer-readable medium coupled to the at least one computer having instructions stored thereon which, when executed by the at least one computer, causes the at least one computer to perform operations. The operations include receiving input related to advertising preferences of a user of a media system that is connected to a content delivery network and defining an advertisement control policy for the user of the media system based on the received input. The operations also include during viewing, on the media system, of a channel provided by the content delivery network, controlling the media system to deliver advertisements based on the defined advertisement policy.

In yet another aspect, at least one computer-readable storage medium is encoded with at least one computer program comprising instructions that, when executed, operate to cause a processor to perform operations. The operations include receiving input related to advertising preferences of a user of a media system that is connected to a content delivery network and defining an advertisement control policy for the user of the media system based on the received input. The operations also include during viewing, on the media system, of a channel provided by the content delivery network, controlling the media system to deliver advertisements based on the defined advertisement policy.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers represent corresponding parts throughout.

DETAILED DESCRIPTION

Figure 1:
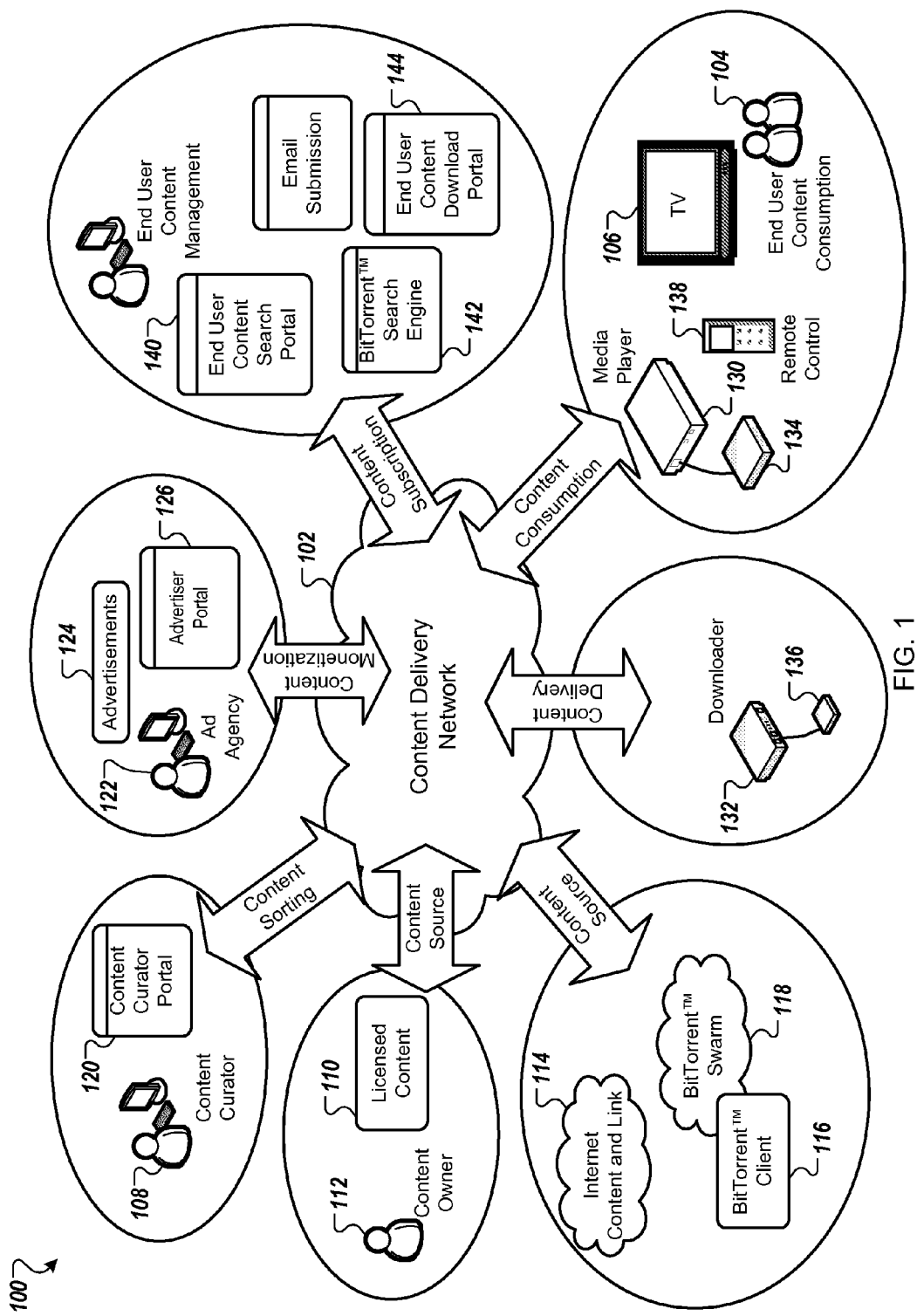
FIGS. 1, 2, 3, 17, and 20 are diagrams of exemplary systems.

FIG. 1 illustrates a content delivery system 100. The system 100 provides support for various aspects of content delivery, such as content sourcing, content sorting, content monetization, content subscription, content download, and content consumption. The content delivery system 100 includes a content delivery network 102. The content delivery network 102 may be one or more public or private, wired or wireless networks, such as the Internet or a Session Initiated Protocol (SIP) network such as the PsipTNT™ network offered by TelTel™. Using the system 100, end users 104 may view channels, for example, on a television 106 located in their home. Channels may be defined by end users 104, or by "content curators" 108.

Multiple types of content, such as audio (e.g., music, podcasts), video, and still images (e.g., photographs), may be made available over the content delivery network 102. Licensed and license-free content may be made available. For example, licensed content 110 may be acquired from a content owner 112.

Content may be made available from a variety of sources. For example, Internet content may be accessed from an Internet link 114 (e.g., URL (Uniform Resource Locator)). Content may also be accessed from peer-to-peer networks. For example, content may be accessed from one or more BitTorrent™ clients 116 which are part of one or more BitTorrent™ "swarms" 118. Content may be accessed from other sources, such as from a television broadcast (e.g., MSO (Multiple System Operator), cable, satellite, local) or from content (e.g., photographs, audio, previously recorded video) available from devices (e.g., DVR, stereo, computer, DVD (Digital Video Disc) player) connected to a user's home network and/or located in a user's home.

Content curators 108 may use a content curator portal 120 to define custom channels which may be made available for subscription by end users 104. The content curators 108 may be commissioned to search for, select, and organize multiple types of content from various sources into channels. Content curators 108 may, for example, organize channels by topic or genre. Content curators 108 may, for example, select licensed content, license-free content, BitTorrent™ content, or content from their private collection, to name a few examples.

Channels may be offered for free to end users 104 or end users 104 may subscribe to channels on a fee basis. Users may rate or rank channels or content curators based, for example, on programming selection, sequencing, and quality. Content curators 108 may be promoted, for example, based on popularity.

Content owners 112 may be compensated for the use of licensed content 110 that they own which is used in channels defined by content curators 108. For example, the system 100 may provide support for digital rights management (DRM). By allowing access to their licensed content 110, content owners 112 may experience increased distribution and revenue and targeted exposure in focused channels. Multiple revenue agreements may be possible, such as per-use agreements, subscription revenue sharing, and advertisement revenue sharing.

A content curator 108 may work with one or more advertisers 122, such as an ad agency, to include advertisements 124 on a channel. For example, an advertisement may be displayed if a user switches a channel or when a program finishes. As another example, advertisements may be displayed on the display of a remote control device, such as while a program is being displayed on a television. Content curators 108, advertisers 122, and content owners 112 may share advertising revenue. Sharing in advertising revenue may provide an incentive for content curators 108 to create interesting and popular channels. A content curator 108 may work with one or more advertisers 122 to create one or more advertisements 124 which are customized and targeted for one or more particular channels. End users 104 may customize advertisement viewing preferences, such as by specifying preferred topics, preferred or excluded companies, region preferences, etc.

Advertisers 122 may use an advertiser portal 126 to upload advertisements 124 and to control advertisement publication.

Advertisers 122 may define and apply advertisement insertion rules to particular advertisements 124 and/or may allow a content curator 108 to decide when and how to insert the advertisements 124 into channels defined by the content curator 108. APIs (Application Programming Interfaces) may be provided which allow advertisers 122 to enable the system 100 to interface with standard advertisement inventory management systems to allow for control and management of advertisements 124. Various advertisement pricing plans may be supported, such as individually-priced ads or bulk pricing. Other advertising features may be included, such as online purchasing of items or providing customer contact options.

Advertisers 122, content curators 108, and content owners 112 may access user viewing behavior data. Advertisers 122 may access user viewing behavior data, such as viewed channels, viewed content, viewed advertisements, advertisement display frequency, advertisement viewed length, user actions during advertisement display, user characteristics, advertisement and content view times, advertisement and content view counts, and hosting channel information, to monitor reach and performance of advertising campaigns. Advertisements may be targeted to specific users based on recorded user viewing behavior data. Content curators 108 may access user viewing behavior data to learn about behaviors of end users 104 who subscribe to their channels. Content owners 112 may access user viewing behavior data to learn about their fan base, such as accessing information about user demographics, time of day of access, and user actions during content display. Content presentation and playback may be customized and personalized for a particular end user 104, based specifically on recorded user viewing behavior of the particular end user 104 and generally on recorded user viewing behavior of all users.

User viewing behavior data may be captured, for example, by a media player 130 and/or a downloader device 132. The media player 130 and/or the downloader device 132 may play content included or ordered on a channel defined by a content curator 108. In some implementations, the media player 130 may play content downloaded from the content delivery network 102 by the downloader device 132. In some implementations, the media player 130 and the downloader device 132 are different logical functions of the same physical device. In other implementations, the media player 130 and the downloader device 132 are different physical devices. In some implementations, the media player 130 is a software application which may be executed, for example, on a computing device such as a desktop or laptop computer.

The media player 130 and/or the downloader device 132 may be connected to external media storage devices 134, 136 respectively. The external media storage devices 134, 136 may be, for example, USB (Universal Serial Bus) drives. The external media storage devices 134, 136 may be used, for example, to transfer data to/from the media player 130 or the downloader device 132, respectively, such as to transfer data to/from a computing device.

The media player 130 and/or the downloader device 132 may communicate wirelessly with one or more remote control devices 138. The end user 104 may navigate through channels and perform other functions using the remote control device 138. The remote control device 138 may communicate (e.g., using Infrared (IR) technology of radio frequency (RF) technology) with the television 106, the media player 130, and/or the downloader device 132. The remote control device 138 also may communicate over a network with the media player 130 and/or the downloader device 132 to control functions of the media player 130 or the downloader device 132. The remote control device 138 may include a small display screen that displays preview content and/or advertisements.

The media player 130 and/or the downloader device 132 may download content from the content delivery network 102 without consuming resources of a computing device owned by the end user 104. For example, content may be downloaded into the home of an end user 104 without using resources of a personal computer owned by the end user 104. The media player 130 and the downloader device 132 may use less electricity than a personal computer, thus reducing the electric bill of the end user 104. The media player 130 and/or the downloader device 132 may connect to other computing devices connected on a user's home network. The media player 130 and/or the downloader device 132 may include built-in functionality to communicate with and download information from a peer-to-peer network, such as the BitTorrent™ swarm 118.

The end user 104 may search for and subscribe to content using an end-user content search portal 140. For example, the end-user content search portal 140 may provide a directory listing of available defined channels. The directory listing may be organized in a hierarchy of categories and sub-categories. A particular channel may appear in one or more categories or sub-categories. The end-user content search portal 140 may also provide a search function to allow end users to search for available defined channels based on a keyword search. As another example, users may search for channels based on other criteria, such as sorting channels based on channel or content curator popularity or ranking. An end user may subscribe to a defined channel, for example, by selecting a channel link displayed in a directory listing or in a list of search results.

The end user 104 may also search for and initiate download of individual content items to the downloader device 132 using a partner site such as a BitTorrent™ search engine 142. As another example, the end user 104 may send an email which includes a content link to an email address associated with their downloader device 132 to initiate an automatic download to the downloader device 132 of the content linked to by the content link. The content link may refer to a content file available on the Internet, and may be a reference to a video resource available from a streaming video website. The end user 104 may send an email with an attachment to an email address associated with the downloader device 132, to initiate a download of the attachment to the downloader device 132. The end user 104 may use an end-user content download portal 144 to search for and to select content to download to the downloader device 132.

Figure 2:
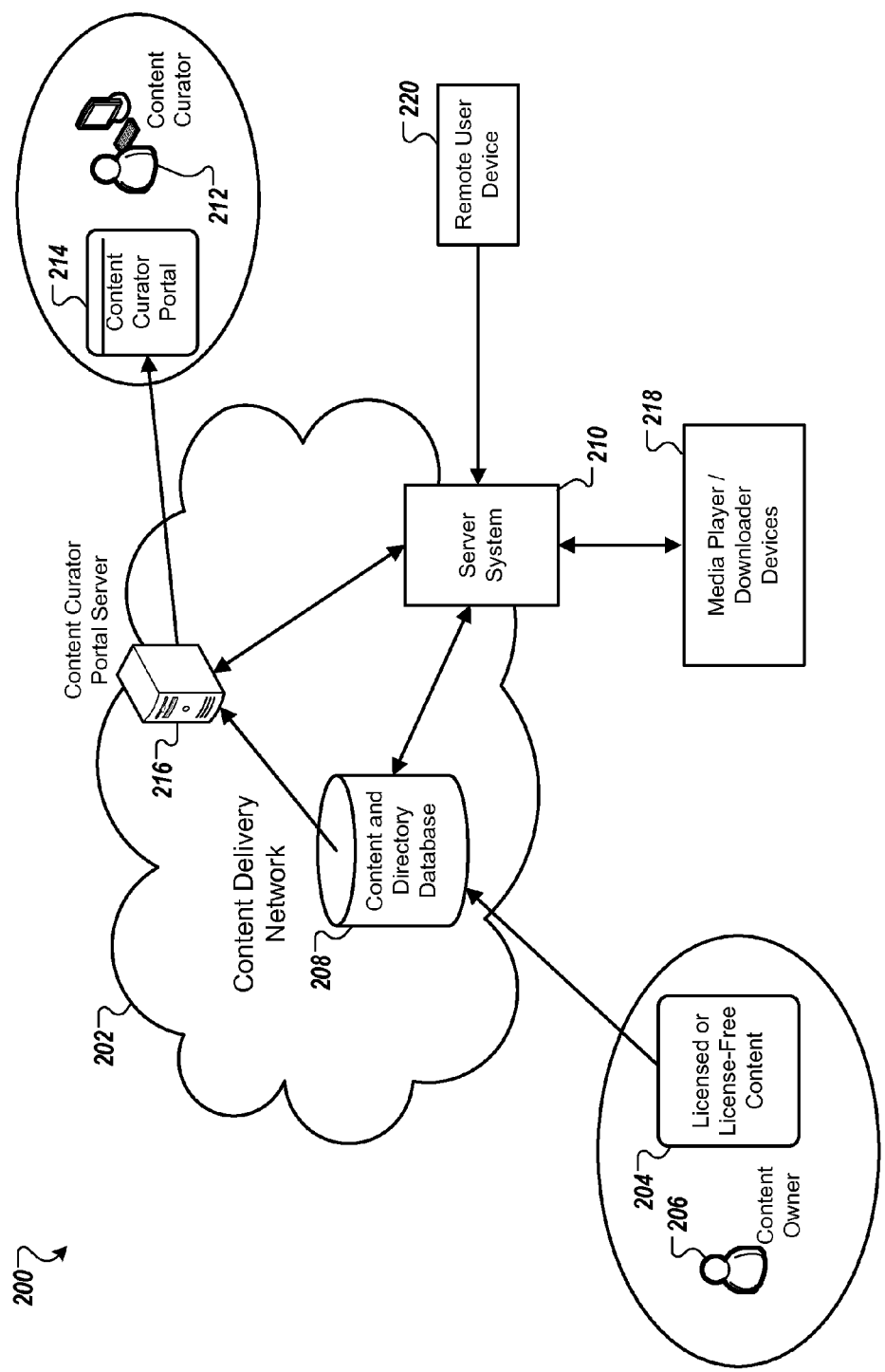

FIG. 2 illustrates a system 200 for content sourcing and download over a content delivery network 202. Licensed or license-free content 204 is acquired from one or more content owners 206 or from a publicly available source, such as the Internet. For example, content owners 206 may transfer content over the content delivery network 202 to a content and directory database 208. Content may also be transferred to the content and directory database 208 from a server system 210, such as using a DVD or CD (Compact Disc) drive. License-free content, such as license-free video or podcasts, may be downloaded from the Internet and stored in the content and directory database 208. In some implementations, some or all content may be stored in the content and directory database 208 as BLOBs (Binary Large Objects). In some implementations, some or all content may be stored in the file system of the server system 210 and references to file system locations may be stored in the content and directory database 208.

The content and directory database 208 stores information about content and also information about defined channels. Content curators 212 may use a content curator portal 214 to define channels and to manage defined channels. The content curator portal 214 may display a listing of licensed and license-free content available in the content and directory database 208. The content curator portal 214 may also provide a search function which allows the content curator 212 to search for content available in the content and directory database 208 and to also search for content included in the private collection of the content curator 212 or content available on the Internet, such as content available from peer-to-peer networks, such as BitTorrent™.

The content curator portal 214 may communicate with a content curator server 216. For example, a channel definition defined using the content curator portal 214 may be sent to the content curator server 216, which may communicate with the server system 210 to request that the channel definition be stored in the content and directory database 208. As another example, information for existing channel definitions associated with a particular content curator 212 may be retrieved from the content and directory database 208 and sent from the content curator portal server 216 to the content curator portal 214 for display.

In some implementations, the content curator portal server 216 is one physical server computing device and in other implementations, the content curator portal server 216 includes multiple physical server computing devices. Similarly, in some implementations, the server system 210 is one physical server computing device, and in other implementations, the server system 210 includes multiple physical server computing devices. In some implementations, multiple physical server computing devices are used, with some or all server computing devices implementing both the content curator portal server 216 and the server system 210. In some implementations, one physical server computing device is used, with the one physical server device implementing both the content curator portal server 216 and the server system 210.

The network 202 may be one or more public or private, wired or wireless networks, such as the Internet, or may be a Session Initiated Protocol (SIP) network such as the PsipTNT™ network offered by TelTel™. The network 202 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data services. The network 202 may include multiple networks or subnetworks, each of which may include, for example, a wired or wireless data pathway.

Content may be downloaded to one or more user media player/downloader devices 218. For example, content corresponding to a user-subscribed channel may be automatically downloaded to the media player/downloader device 218, in response to a user selection of a corresponding channel. As another example, a user may search for and download content to the media player/downloader device 218. A user may, using a remote user device 220, monitor and manage user-initiated downloads. The remote user device 220 may be any type of electronic device configured to exchange communications with the server system 210 over a network. The remote user device 220 may be a general-purpose computer (e.g., a desktop personal computer, a workstation, or a laptop computer), a mobile or wireless device, or a device designed for a specific function (e.g., a cell phone, a smart phone, a tablet PC, a personal digital assistant (PDA), etc.).

Figure 3:
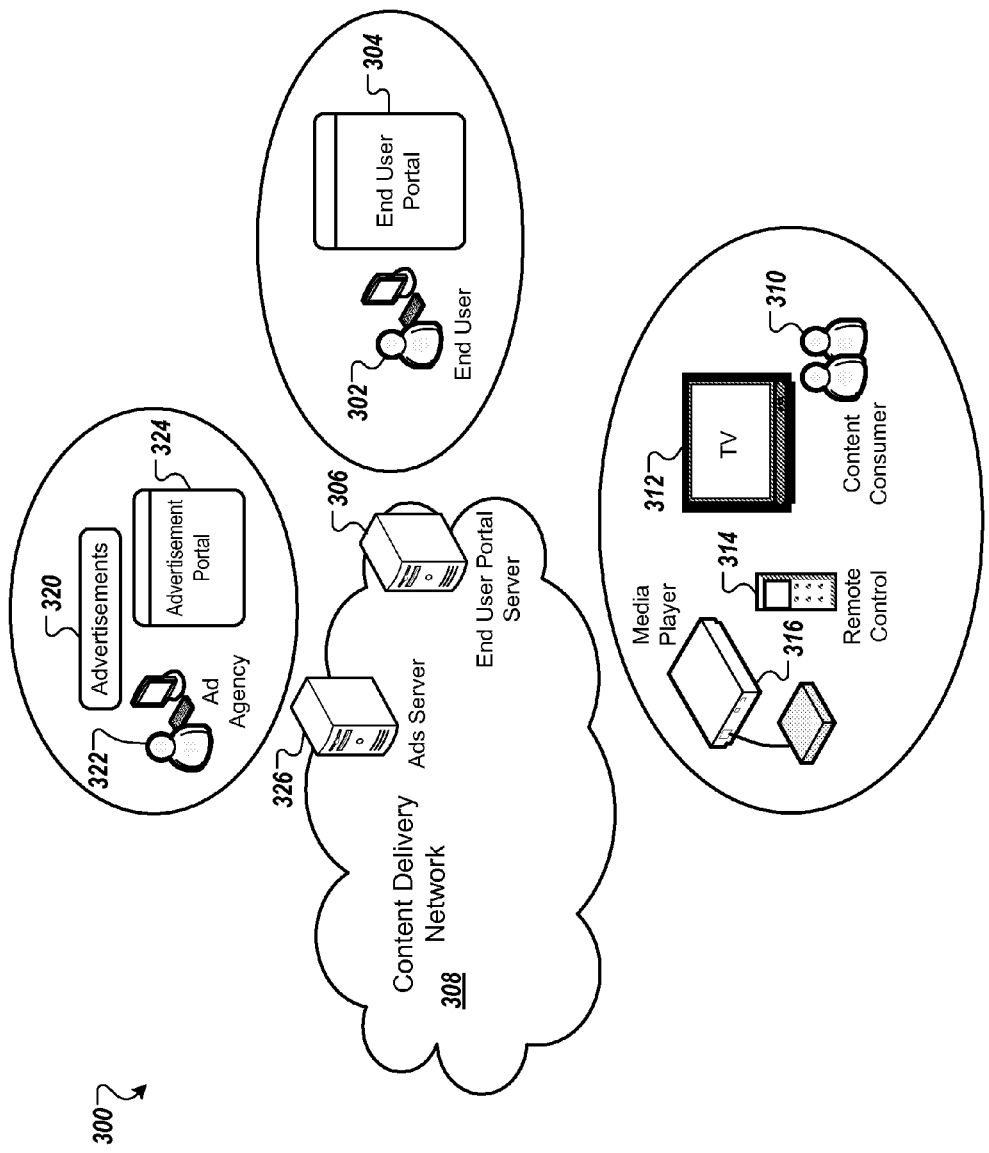

FIG. 3 illustrates an example system 300. An end user 302 may configure advertisement delivery preferences and other settings using an end user portal 304. Advertisement delivery preferences and other settings may be sent to an end user portal server 306 over a content delivery network 308 and stored in the end user portal server 306. As another example, a content consumer 310 may configure advertisement delivery preferences using an interface displayed on a television screen 312 or on the display of a remote control 314. Advertisement delivery preferences may be stored on a media player/downloader device 316 and/or may be sent to the end user portal server 306 over the content delivery network 308.

Advertisements 320 may be organized into one or more advertisement channels. One or more advertisers 322, such as an ad agency, may manage advertisement content using an advertiser portal 324. Advertisement content may be stored on an advertisement server 326. Advertisement content may be downloaded over the content delivery network 308 to the media player/downloader device 316. Advertisement content may also be sent to the remote control 314. As another example, advertisement content may be streamed to the media player/downloader device 316 or the remote control 314. Advertisement content may be played on a display of the remote control 314 and/or advertisement content may be displayed on the television screen 312. Advertisements may be downloaded to the media player/downloader device 316 or to the remote control 314 automatically, without user intervention. In some implementations, advertisements may expire. In these implementations, expired advertisements are not displayed to the user and may be periodically deleted from the media player/downloader device 316 or the remote control 314.

Advertisement content may be displayed on the display of the remote control 314 without impacting simultaneous display of non-advertisement content on the television screen 312. The content consumer 310 may use the remote control 314 to interact with advertisement content displayed on a display of the remote control 314 or advertisement content displayed on the television screen 312. The advertisement server 326 may identify advertisement content to display based on content currently playing on the media player/downloader device 316, based on targeting data related to the content consumer 310, or based on behavior analytics data collected in response to historical use of the media system 316 and the remote control 314.

Figure 4:
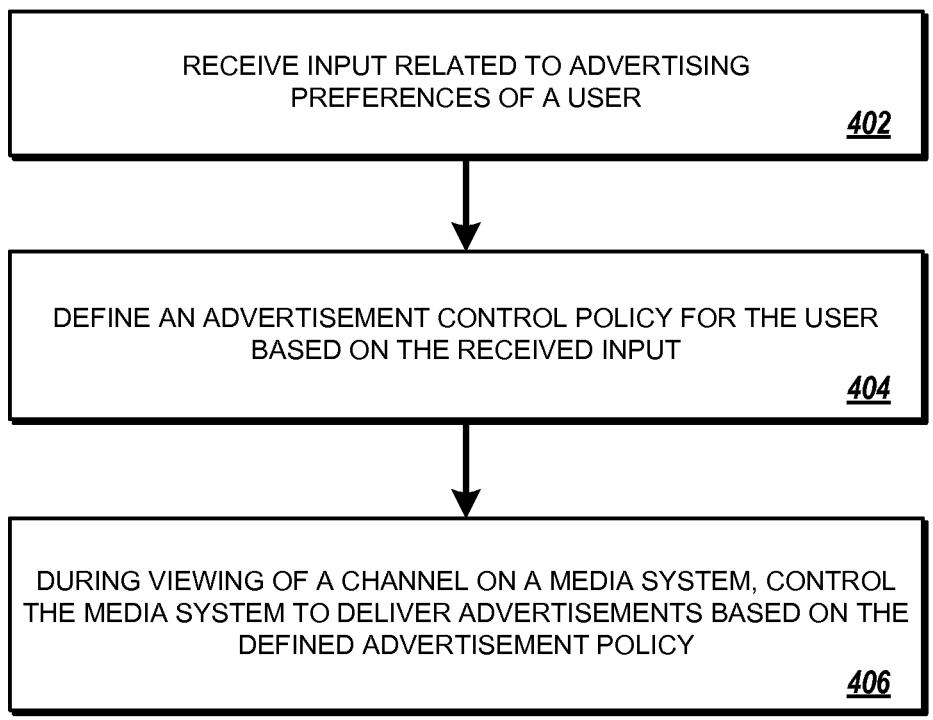
FIGS. 4, 5, 7, 10, 14, and 16 are flowcharts of exemplary processes.

FIG. 4 illustrates an example process 400 for advertisement delivery. The operations of the process 400 are described generally as being performed by the system 200. The operations of the process 400 may be performed by one of the components of the system 200 (e.g., the server system 210) or may be performed by a combination of the components of the system 200. In some implementations, operations of the process 400 may be performed by one or more processors included in one or more electronic devices.

The system 200 receives input related to advertising preferences of a user (402). For example, the system 200 may receive a user input indicating user selection of one or more advertisement channels to be used for displaying advertisement content. As another example, the system 200 may receive user input related to advertisement delivery timing (e.g., receive advertisements every certain number of minutes, receive advertisements upon channel change, receive advertisements upon content file change) and a preferred output device used to display advertisements (e.g., primary output device of a media system, such as a television screen, or a display of a remote control device (or both)). The system 200 may also receive input related to preferred interests of a user. Interests may also be inferred, based on the types of content (e.g., types of non-advertising content or types of advertising content) a user watches. Other advertisement preferences may be inferred, such as from user demographics (e.g., user age, user gender, user location).

The system 200 defines an advertisement control policy for the user based on the received input (404). For example, the system 200 may define an advertisement control policy based on user-selected advertisement channels, to display advertisement content using the user-selected advertisement channels. As another example, the system 200 may automatically identify, without user intervention, an advertisement channel from among multiple, different advertisement channels based on targeting data and/or media system behavior analytics data. The system 200 may also define a user-specific advertisement channel for the user that includes advertisements identified based on targeting data and/or media system behavior analytics data.

In some implementations, the system 200 may identify a set of individual advertisements to display to the user, where the individual advertisements are not included in an advertisement channel. Individual advertisements may be stored, for example, in a central advertisement repository (e.g., a repository accessible by the advertisement server 326). The advertisement control policy may refer to the identified advertisements, or may include a query definition for querying the advertisement repository for one or more individual advertisements, where the query definition is based on the received input related to advertising preferences of the user.

The system 200 may determine one or more rules for controlling advertisement delivery based on user advertising delivery preferences. For example, the system 200 may determine a rule to repeatedly deliver an advertisement after a particular period of time of content viewing on the media system, to repeatedly deliver an advertisement upon change of a channel being output by the media system, or to repeatedly deliver an advertisement upon change of a content file being output by the media system. As another example, the system 200 may determine a rule to output advertisements on the primary output device of the media system in response to receiving input defining that advertisements should be output on the primary output device of the media system, determine a rule to output advertisements on the output device of the remote control of the media system in response to receiving input defining that advertisements should be output on the output device of the remote control of the media system, or determine a rule to output advertisements on both the primary output device of the media system and the output device of the remote control of the media system in response to receiving input defining that advertisements should be output on both the primary output device of the media system and the output device of the remote control of the media system.

During viewing of a channel on a media system, the system 200 controls the media system to deliver advertisements based on the defined advertisement policy (406). For example, the system 200 may automatically switch to an advertisement channel, such as a user-selected advertisement channel, a system-identified advertisement channel or a user-specific, system-defined advertisement channel. As another example, the system 200 may control the media system to deliver one or more advertisements selected from an advertisement repository. In this example, the advertisements in the advertisement repository may not be included in an advertisement channel.

As another example, if the advertisement control policy specifies that advertisements should be repeatedly delivered after a particular period of time of content viewing on the media system, the system 200 may monitor for completion of the particular period of time of content viewing on the media system and may repeatedly deliver an advertisement upon detecting completion of the particular period of time of content viewing on the media system. As yet another example, if the advertisement control policy specifies that advertisements should be repeatedly delivered upon change of a content file being output by the media system, the system 200 may monitor for change of a content file being output by the media system and may repeatedly deliver an advertisement upon detecting change of a content file being output by the media system. If the advertisement control policy specifies that advertisements should be repeatedly delivered upon change of a channel being output by the media system, the system 200 may monitor for change of a channel being output by the media system and may repeatedly deliver an advertisement upon detecting change of a channel being output by the media system.

If the advertisement control policy specifies that advertisements should be output on the primary output device of the media system, the system 200 may control the media system to deliver advertisements using the primary output device of the media system. For example, a media player/downloader device may be controlled to output advertisements on a television screen. If the advertisement control policy specifies that advertisements should be output on the output device of the remote control of the media system, advertisements may be delivered using the output device of the remote control of the media system. For example, advertisements may be displayed on a display screen of the remote control device. If the advertisement control policy specifies that advertisements should be output on both the primary output device of the media system and the output device of the remote control of the media system, advertisements may be delivered using both the primary output device of the media system and the output device of the remote control of the media system.

Figure 5:
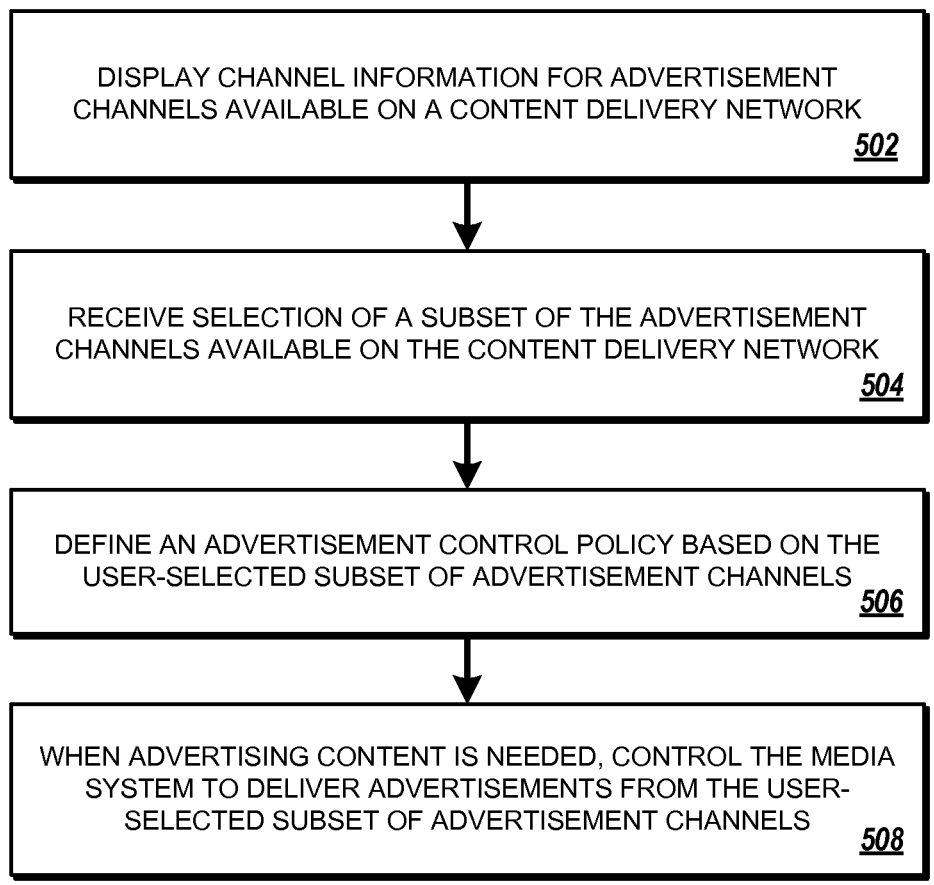

FIG. 5 illustrates an example process 500 for delivering advertisements. The operations of the process 500 are described generally as being performed by the system 200. The operations of the process 500 may be performed by one of the components of the system 200 (e.g., the server system 210) or may be performed by a combination of the components of the system 200. In some implementations, operations of the process 500 may be performed by one or more processors included in one or more electronic devices.

The system 200 displays channel information for advertisement channels available on a content delivery network (502). For example, representations of advertisement channels may be displayed on a user interface, such as a user interface displayed on the display of a remote control device, a user interface displayed on a primary output device of a media system (e.g., television screen), or a user interface displayed on a user interface portal. Channel information may include a channel name, channel description, channel number, or channel category (e.g., genre), to name a few examples.

Figure 6:
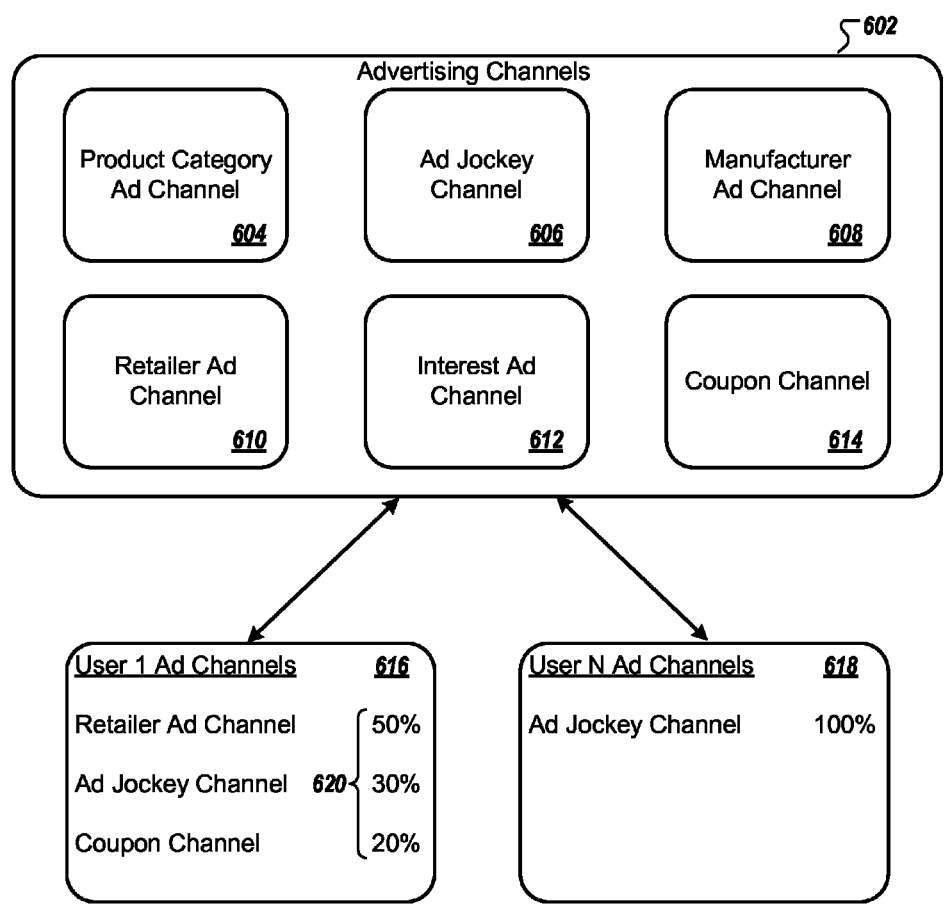
FIG. 6 is a diagram illustrating an exemplary advertisement control policy.

For example, FIG. 6 illustrates an example user interface 602 which displays advertisement channel representations for advertisement channels 604, 606, 608, 610, 612, and 614. Advertisement channel 604 displays advertisements for products of a particular category (e.g., automobiles). Advertisement channel 606 may display advertisements selected by a particular advertisement jockey or content curator, or may display advertisements for products recommended by a particular advertisement jockey or content curator. As another example, the advertisement channel 606 may display advertisements promoting one or more content curators and/or one or more channels. Advertisement channel 608 displays advertisements for products produced by a particular manufacturer and advertisement channel 610 displays advertisements for a particular retailer. Advertisement channel 612 displays advertisements related to a particular user interest (e.g., sports) and advertisement channel 614 displays coupon advertisements. Other types of advertisement channels may be used, such as a channel which displays advertisements with a regional or other geographic focus. As another example, an advertisement channel may display gender-specific advertisements.

The system 200 receives selection of a subset of the advertisement channels available on the content delivery network (504). For example, a user may select one or more advertisement channel representations from among a group of advertisement channel representations displayed in a user interface. For instance, in the example of FIG. 6, the user may select one or more of the advertisement channels 604, 606, 608, 610, 612, and 614. As shown, a first user (user one) has selected the advertisement channels 610, 606, and 614 and a second user (user "N") has selected the advertisement channel 606. The selections of the first user are stored as a first advertisement policy 616 and the selections of the second user are stored as a second advertisement policy 618. The system 200 uses the first advertisement policy 616 to control advertisements presented to the first user and uses the second advertisement policy 618 to control advertisements presented to the second user.

In addition to receiving selection of a subset of advertisement channels, the system 200 may also receive input identifying a percentage allocation for each advertisement channel included in the user-selected subset of advertisement channels, where the percentage allocation defines a percentage of time the corresponding advertisement channel is used to deliver advertisements. For example, the first user has defined percentage allocations 620 which specify that the allocation of time the advertisement channels 610, 606, and 604 are to be used when delivering advertisements to the first user is fifty percent, thirty percent, and twenty percent, respectively. Since the second user has selected only one advertisement channel, the selected advertisement channel 606 may be used one hundred percent of the time when advertisements are delivered to the second user.

The system 200 defines an advertisement control policy based on the user-selected subset of advertisement channels (506). For example, the advertisement control policy may specify that advertising content delivered to the user be selected from the subset of advertisement channels, based on the percentage allocation for each advertisement channel. Advertisements may be delivered, for example, on an interval basis (e.g., every thirty minutes), before the start of a new content item, or when the user switches to a different channel, to name a few examples.

When advertising content is needed, the system 200 controls the media system to deliver advertisements from the user-selected subset of advertisement channels (508). For example, the system 200 may switch a channel from a channel to a user-selected advertisement channel. A remote control device or a media player/downloader device may switch a channel to an advertisement channel. The system 200 may prevent the user from switching channels until at least a mandatory advertisement viewing time has elapsed.

Advertisements may be delivered in accordance with the percentage allocation for each advertisement channel. For example, the system 200 may track the amount of time advertising content is played from each advertisement channel included in the user-selected subset of advertisement channels, and may calculate a difference, for each advertisement channel, between the percentage allocation for the advertisement channel and the percentage of actual advertising content playback time for the advertisement channel (e.g., for a particular advertisement channel, the percentage allocation may be twenty percent, but the current percentage of actual advertising content playback time for the channel may be eighteen percent). A next advertisement channel to use for advertising content may be selected by identifying the advertisement channel which has the maximum corresponding calculated difference.

For example, a first advertisement channel may have a percentage allocation of twenty percent and an actual, current advertising content playback percentage of eighteen percent, for a calculated difference of two percent. A second advertisement channel may have a percentage allocation of thirty percent and an actual, current advertising content playback percentage of twenty seven percent, for a calculated difference of three percent. The second advertisement channel may be selected over the first advertisement channel for delivery of the next advertising content to be delivered to the user because it has a greater calculated difference.

In some implementations, a user may use a user interface to select a set of individual advertisements to display (e.g., where the individual advertisements are not included in an advertisement channel). For example, the user may select a set of advertisement representations. An advertisement control policy may be defined which directs the system 200 to select a user-selected advertisement when advertisement content is needed. When advertisement content is needed, the system 200 may control the media system to access and deliver a user-selected advertisement.

In some implementations, a user-selected advertisement is downloaded to the user's media player/downloader device or to the user's remote control device after the user selects the advertisement, and the advertisement is accessed from electronic storage of the media player/downloader device or electronic storage of the remote control device when advertisement content is needed. In some implementations, the system 200 may determine whether to deliver advertising using a user-selected individual advertisement, using an advertisement channel, or using a system-identified individual advertisement. For example, the system 200 may select a user-selected advertisement if a user-selected advertisement is available, and may deliver an advertisement from an advertisement channel or may identify an individual advertisement not selected by the user if there are no user-selected individual advertisements available.

Figure 7:
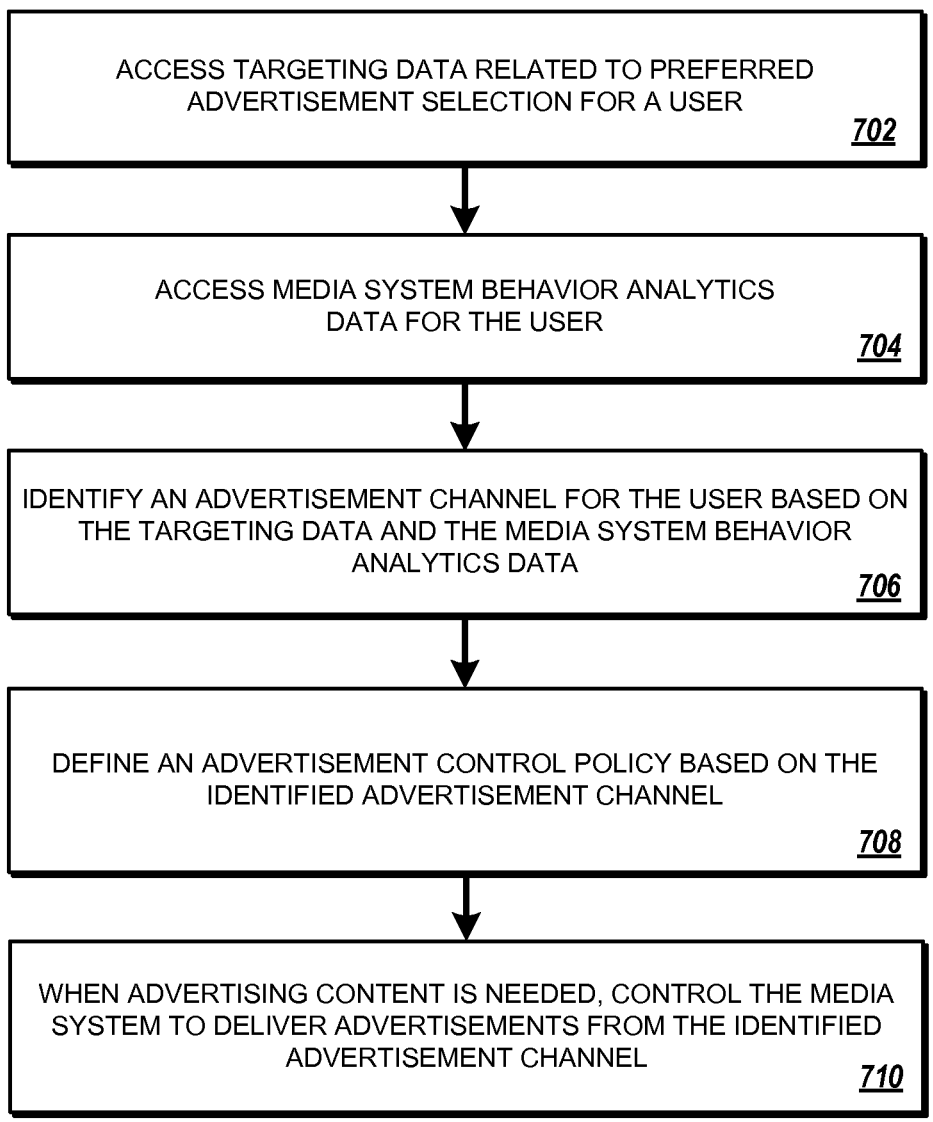

FIG. 7 illustrates an example process 700 for advertisement delivery. The operations of the process 700 are described generally as being performed by the system 200. The operations of the process 700 may be performed by one of the components of the system 200 (e.g., the server system 210) or may be performed by a combination of the components of the system 200. In some implementations, operations of the process 700 may be performed by one or more processors included in one or more electronic devices.

The system 200 accesses targeting data related to preferred advertisement selection for a user (702). For example, targeting data may be stored user preferences entered by a user which indicate preferred advertisement selections. A user may enter user preferences, for example, using a user interface displayed on a remote control device, on a primary display of a media system (e.g., television screen), or on an end user portal. User preferences may be stored, for example, in a user profile.

Figure 8:
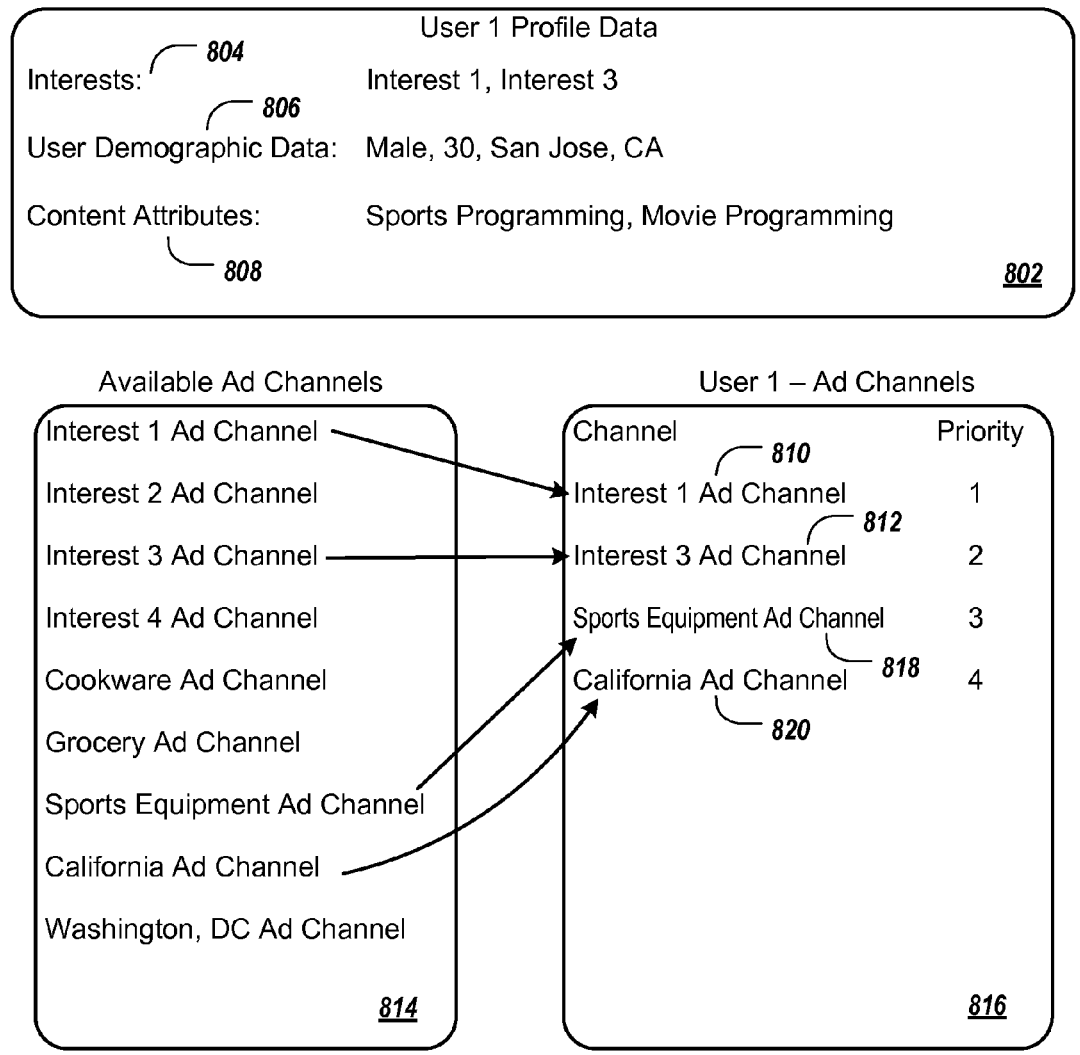
FIG. 8 is a diagram illustrating identification of exemplary advertising channels based on targeting data and media system behavior analytics data.

FIG. 8 illustrates example user profile data 802 for a "user one" user. The user profile data 802 includes interests 804 which indicate that user one may have entered "interest one" and "interest three" as interests for preferred advertisement selection. Targeting data may also be based on user demographic data. For example, the user profile data 802 includes user demographic data 806 which indicates that user one is male, thirty years old, and lives in San Jose, Calif.

The system 200 accesses media system behavior analytics data for the user (704). For example, the system 200 may access media system behavior analytics data which is based on tracked content viewing behavior and/or tracked remote control behavior of a user. The system 200 may track channels subscribed to by the user and watched by the user and a type or genre of each channel. The system 200 may also track content items watched by the user, and a type or genre of each content item. The system 200 may track a user's remote control actions, such as interactions with advertisements (e.g., browse product, compare product, purchase product, fast forward advertisement, rewind advertisement, pause advertisement, skip advertisement) or a user's browsing of channels or content items in a content guide. In the example of FIG. 8, the user profile data 802 includes content attributes 808 which indicate that user one is interested in sports programming and movie programming. The content attributes 808 may be inferred, for example, based on the types of content (e.g., types of non-advertising content or types of advertising content) watched by user one.

The system 200 identifies an advertisement channel for the user based on the targeting data and the media system behavior analytics data (706). For example, the system 200 may identify, from among a set of available advertisement channels, one or more advertisement channels which relate to the targeting data and/or the media system behavior analytics data. For instance, in the example of FIG. 8, an interest one advertisement channel 810 and an interest three advertisement channel 812 have been identified from a set 814 of available advertisement channels, based on the interests 804, for inclusion in a set 816 of advertisement channels for user one. As another example, a sports equipment advertisement channel 818 has been identified from the set 814 of available advertisement channels, based on the content attributes 808, for inclusion in the set 816 of advertisement channels for user one. As yet another example, a California advertisement channel 820 has been identified from the set 814 of available advertisement channels, based on the demographic data 806, for inclusion in the set 816 of advertisement channels for user one. The interest one advertisement channel 810 and the interest three advertisement channel 812 have been assigned priorities of one and two, respectively, because these channels are based on interests explicitly specified by user one and, therefore, have a relatively high likelihood of matching user one's interests. The sports equipment advertisement channel 818 has been assigned a priority of three because it matches content explicitly selected by user one for viewing and, therefore, has been determined to have the next best chance of matching user one's interests. The California advertisement channel 820 has been assigned a priority of four because it has been inferred from demographic data of user one and, therefore, has been determined to have the lowest chance of matching user one's interests of the selected advertisement channels.

Figure 9:
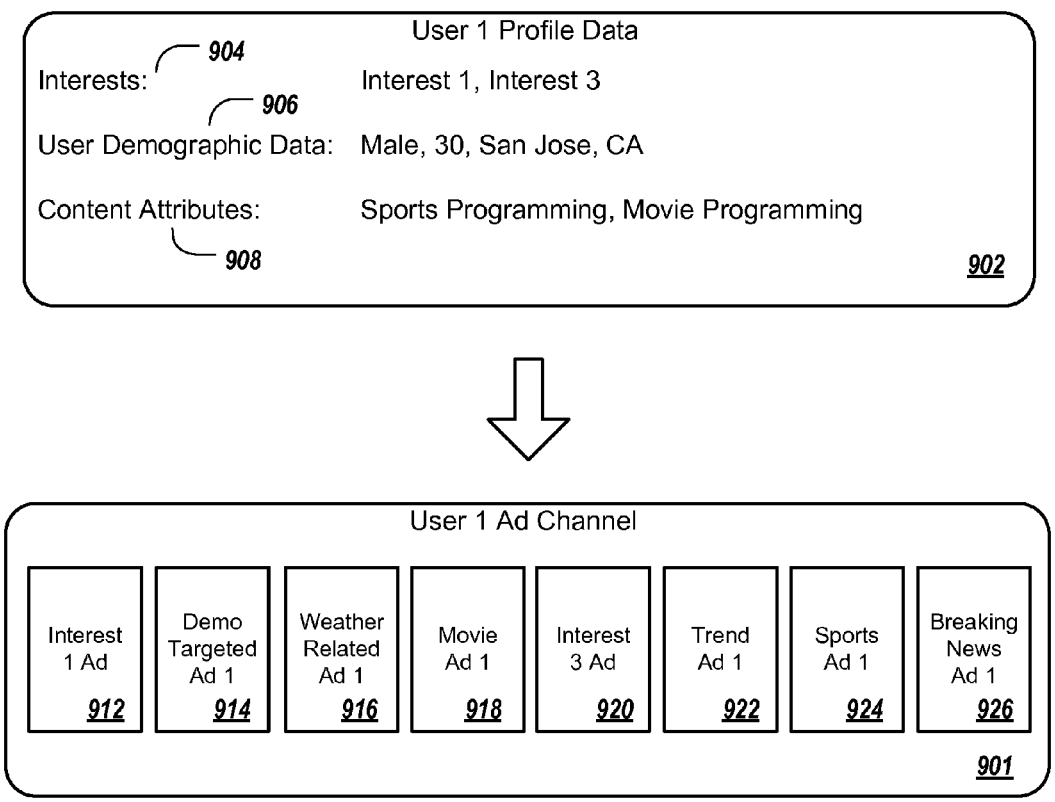
FIG. 9 illustrates an exemplary advertising channel.

In some implementations, the system 200 may create a user-specific advertisement channel based on the targeting data and the media system behavior analytics data. For example, FIG. 9 illustrates a user-specific advertisement channel 901 created for a "user one" user, based on user profile data 902. Similar to the user profile data 802 described above with respect to FIG. 8, the user profile data 902 includes user interests 904, demographic data 906, and content attributes 908.

The user-specific advertisement channel 901 includes advertisements 912, 914, 916, 918, 920, 922, 924, and 926. The advertisement 912 and the advertisement 920 are related to "interest one" and "interest three", respectively, and may have been selected from among available advertisements based on the user interests 904. The advertisement 914 may be an advertisement targeted to one or more demographics included in the demographics 906. The movie-related advertisement 918 and the sports-related advertisement 924 may have been selected based on the content attributes 908.

The user-specific advertisement channel 901 may include other types of advertisements. For example, the advertisement 916 is a weather-related advertisement that is suitable for the current weather and the advertisement 926 is a breaking news advertisement that is relevant to breaking news. Advertisements may also be selected based on trends identified by social media organizations. For example, the advertisement 922 is a trend-related advertisement that corresponds to trends identified on social network, messaging, and/or search systems. Advertisements may be time-sensitive, such as a retailer advertisement which has a particular expiration date. The content in a user-specific advertisement channel may be updated dynamically in response to changes to a user's interests, demographics, media system behavior, or to changes in an inventory of available advertisements.

In some implementations, the system 200 may identify a set of individual advertisements to display to the user based on the targeting data and the media system behavior analytics data, where the individual advertisements are not included in an advertisement channel. Individual advertisements may be stored, for example, in a central advertisement repository (e.g., a repository accessible by the advertisement server 326).

Returning to FIG. 7, the system 200 defines an advertisement control policy based on the identified advertisement channel (708). For example, the advertisement control policy may specify that advertisements be delivered from one or more identified advertisement channels selected from among available advertisement channels or from a user-specific advertisement channel. Advertisements may be delivered, for example, on an interval basis (e.g., every thirty minutes), before the start of a new content item, or when the user switches to a different channel, to name a few examples. In some implementations, an advertisement control policy may refer to the identified individual advertisements which are not included in an advertisement channel, or may include a query definition for querying an advertisement repository for one or more individual advertisements, where the query definition is based on the targeting data and the media system behavior analytics data.

If multiple advertisement channels are identified from among available advertisement channels, the advertisement control policy may indicate a priority order for the multiple identified advertisement channels. For instance, in the example of FIG. 8, the set 816 of advertisement channels identified for user one includes a prioritization of advertisement channels in an order of advertisement channels 810, 812, 818, and 820, ordered from highest priority to lowest priority. For example, the advertisement channel 810 may have a more relevant match to the user profile data 802 than the advertisement channel 820. If the advertisement control policy is based on a priority order of advertisement channels, advertisement channels with a higher priority may be displayed more often than advertisement channels with a lower priority.

When advertising content is needed, the system 200 controls the media system to deliver advertisements from the identified advertisement channel (710). For example, the system 200 may switch a channel from a channel to an identified advertisement channel. For example, a remote control device or a media player/downloader device may switch a channel to an advertisement channel. The system 200 may prevent the user from switching channels until at least a mandatory advertisement viewing time has elapsed after the system 200 has caused an advertisement channel to be displayed. As another example, the system 200 may control the media system to deliver one or more advertisements selected from an advertisement repository.

Figure 10:
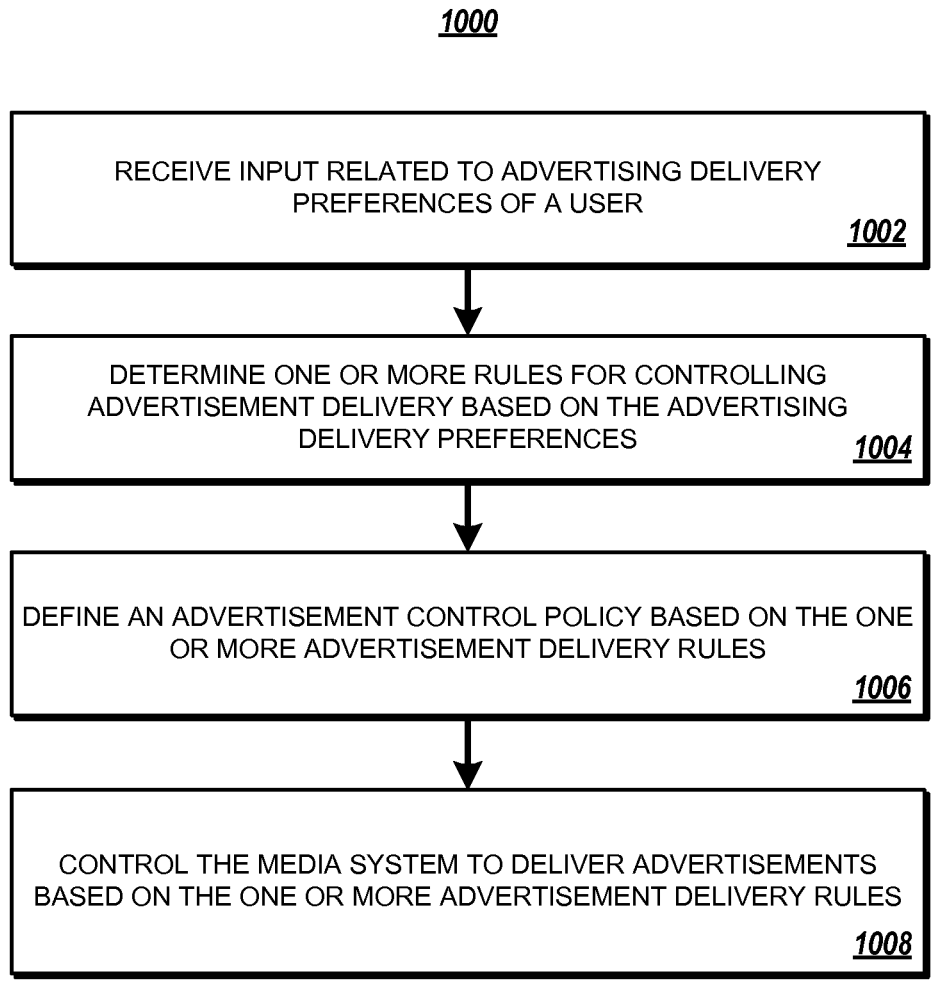

FIG. 10 illustrates an example process 1000 for advertisement delivery. The operations of the process 1000 are described generally as being performed by the system 200. The operations of the process 1000 may be performed by one of the components of the system 200 (e.g., the server system 210) or may be performed by a combination of the components of the system 200. In some implementations, operations of the process 1000 may be performed by one or more processors included in one or more electronic devices.

Figure 11:
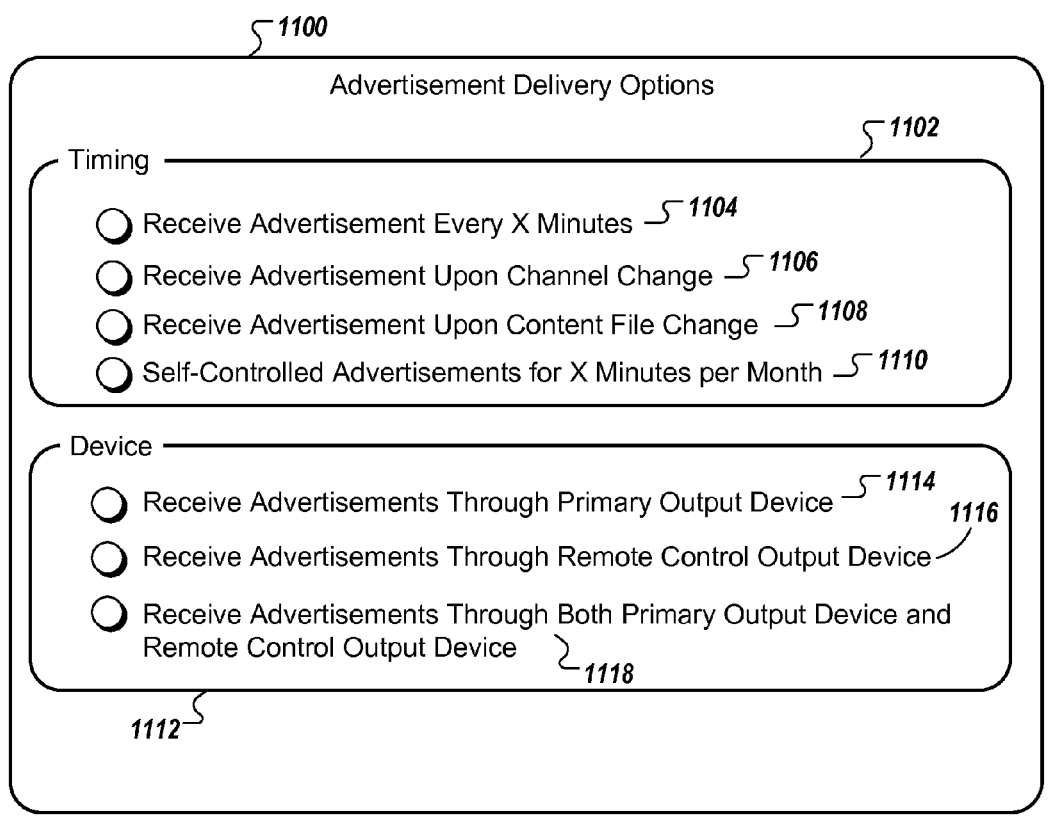
FIGS. 11, 15, 18, and 19 are diagrams of exemplary user interfaces.

The system 200 receives input related to advertising delivery preferences of a user (1002). For example, a user may configure advertising delivery preferences on a user interface, such as a user interface displayed on the display of a remote control device, a user interface displayed on a primary output device of a media system (e.g., television screen), or a user interface displayed on an end user interface portal. For example, FIG. 11 illustrates an example user interface 1100 for configuring advertising delivery options.

The user may configure the timing of advertisement delivery using a timing area 1102. For example, the user may select control 1104 to repeatedly receive advertisements after a particular period of time (e.g., thirty minutes) of content viewing on the media system. The user may select control 1106 to repeatedly receive an advertisement upon change of a channel being output by the media system. The user may select control 1108 to repeatedly receive an advertisement upon change of a content file being output by the media system. The user may select control 1110 to enable self-controlled advertising. For example, with self-controlled advertising, the user may be required to manually select and watch a certain number of minutes (e.g., one hundred minutes) of advertising content per month. As another example, the user may be required to manually select and watch a certain number of minutes of advertisement content where the viewing time of the advertisement content is a percentage of total non-advertisement content viewing time. For example, a user may be required, on a periodic basis (e.g., monthly), to manually select and watch advertising content having a total viewing time equal to at least five percent of the total non-advertising content viewing time for the user. The system 200 may track the self-controlled advertisement viewing of users and penalize users that do not meet the agreed upon advertisement viewing requirements. The penalty may be a monetary penalty or forced advertisement viewing in which a media system for a penalized user is locked until the agreed upon advertisement viewing requirements have been met.

The user may configure a target output device for advertisements using a device area 1112. For example, the user may select control 1114 to specify that advertisements should be output on a primary output device of the media system (e.g., television screen). The user may select control 1116 to specify that advertisements should be output on an output device of a remote control of the media system (e.g., a remote control display screen). The user may select control 1118 to specify that advertisements should be output on both the primary output device of the media system and the output device of the remote control of the media system.

Returning to FIG. 10, the system 200 determines one or more rules for controlling advertisement delivery based on the advertising delivery preferences (1004). For instance, in reference to the example of FIG. 11, the system 200 may determine a rule to repeatedly deliver an advertisement after a particular period of time of content viewing on the media system in response to user selection of the control 1104. The system 200 may determine a rule to repeatedly deliver an advertisement upon change of a channel being output by the media system in response to user selection of the control 1106. The system 200 may determine a rule to repeatedly deliver an advertisement upon change of a content file being output by the media system in response to user selection of the control 1108. The system 200 may configure a rule involving self-controlled advertisement selection in response to user selection of the control 1110.

In addition, the system 200 may determine a rule to output advertisements on the primary output device of the media system in response to user selection of the control 1114. The system 200 may determine a rule to output advertisements on the output device of the remote control of the media system in response to user selection of the control 1116. The system 200 may determine a rule to output advertisements on both the primary output device of the media system and the output device of the remote control of the media system in response to user selection of the control 1118.

Returning to FIG. 10, the system 200 defines an advertisement control policy based on the one or more advertisement delivery rules (1006). For example, the system 200 may define an advertisement control policy based on a rule related to advertisement delivery timing and/or based on an advertisement delivery output device.

Figure 12:
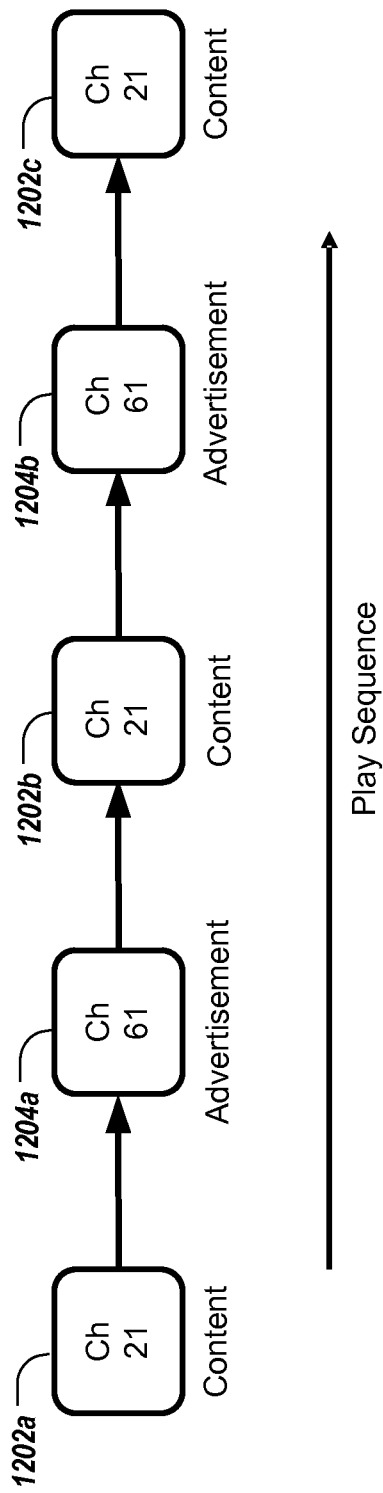
FIGS. 12 and 13 illustrate examples of switching between a channel and an advertising channel.

The system 200 controls the media system to deliver advertisements based on the one or more advertisement delivery rules (1008). For example, if the advertisement control policy specifies that advertisements should be repeatedly delivered after a particular period of time of content viewing on the media system, the system 200 may monitor for completion of the particular period of time of content viewing on the media system and may repeatedly deliver an advertisement upon detecting completion of the particular period of time of content viewing on the media system. For example and as shown in FIG. 12, a media system may be outputting non-advertising content on a channel twenty one (e.g., as illustrated by channel representation 1202*a*). After a particular time period (e.g., thirty minutes) has elapsed, the system 200 may switch to an advertisement channel sixty one (e.g., as illustrated by channel representation 1204*a*). When advertisement content is complete, the system 200 switches back to the channel twenty one (e.g., as illustrated by channel representation 1202*b*).

The system 200 plays content on the channel for the particular time period and when the particular time period elapses again, the system 200 may switch to the advertisement channel sixty one (e.g., as illustrated by channel representation 1204*b*). Similar to the cycle described above, when advertisement content is complete, the system 200 switches back to the channel twenty one (e.g., as illustrated by channel representation 1202*c*). Channel switching may be automatically performed, without user intervention, for example, by a remote control device or by a media player/downloader device. Although FIG. 12 illustrates switching to an advertisement channel for advertisement delivery, as another example, one or more individual advertisements not included in an advertisement channel may be delivered.

Returning to FIG. 10, as another example, if the advertisement control policy specifies that advertisements should be repeatedly delivered upon change of a content file being output by the media system, the system 200 may monitor for change of a content file being output by the media system and may repeatedly deliver an advertisement upon detecting change of a content file being output by the media system.

Figure 13:
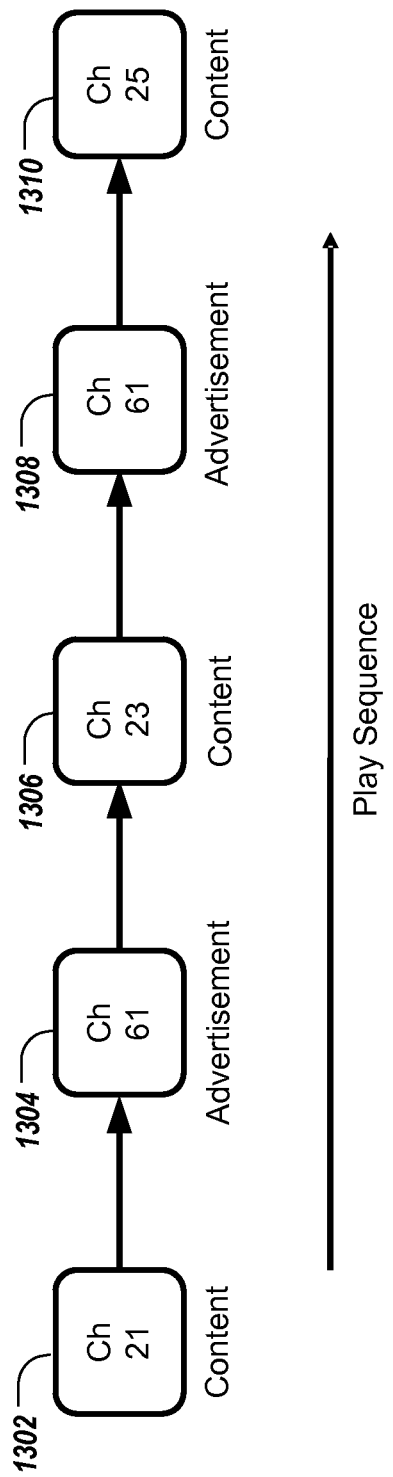

If the advertisement control policy specifies that advertisements should be repeatedly delivered upon change of a channel being output by the media system, the system 200 may monitor for change of a channel being output by the media system and may repeatedly deliver an advertisement upon detecting change of a channel being output by the media system. For example and as shown in FIG. 13, a media system may be outputting non-advertising content on a channel twenty one (e.g., as illustrated by channel representation 1302). If the system 200 detects a user request to change to a different channel (e.g., channel twenty three), the system 200 may, before switching to channel twenty three, switch to an advertisement channel (e.g., advertisement channel sixty one, as illustrated by channel representation 1304), resulting in the output of advertisement content.

When the advertisement content is complete, the system 200 may switch to the requested channel twenty three (e.g., as illustrated by channel representation 1306). If the system 200 detects a user request to change to a different channel (e.g., channel twenty five), the system 200 may, similar to the processing described above, switch to an advertisement channel (e.g., advertisement channel sixty one, as illustrated by channel representation 1308), resulting in the output of advertisement content. When the advertisement content is complete, the system 200 may switch to the requested channel twenty five (e.g., as illustrated by channel representation 1310). Although FIG. 13 illustrates switching to an advertisement channel for advertisement delivery, as another example, one or more individual advertisements not included in an advertisement channel may be delivered.

Returning to FIG. 10, if the advertisement control policy specifies that advertisements should be output on the primary output device of the media system, the system 200 may control the media system to deliver advertisements using the primary output device of the media system. For example, a media player/downloader device may be controlled to output advertisements on a television screen. For example, an advertisement displayed on a television screen may be selected based on content being displayed on the display of a remote control device. For example, a content preview file or a content file may be displayed on the remote control device and an advertisement to display on the television screen may be selected based on the genre of the content preview file or content file being displayed on the remote control device.

If the advertisement control policy specifies that advertisements should be output on the output device of the remote control of the media system, advertisements may be delivered using the output device of the remote control of the media system. For example, advertisements may be displayed on a display screen of the remote control device. For example, an advertisement displayed on a remote control device may be selected based on content being displayed on a television screen. For example, a content preview file or a content file may be displayed on the television screen and an advertisement to display on the remote control device may be selected based on the genre of the content preview file or content file being displayed on the television screen.

If the advertisement control policy specifies that advertisements should be output on both the primary output device of the media system and the output device of the remote control of the media system, advertisements may be delivered using both the primary output device of the media system and the output device of the remote control of the media system. In some implementations, an attempt is made to display an equal amount of advertisements (e.g., equal in number of advertisements, equal in advertisement viewing time) on each of the primary output device and the output device of the remote control. In other implementations, whether to display advertisements on the primary output device or the output device of the remote control may be based on user remote control behavior analytics data. For example, if user remote control behavior analytics data indicates that a user has a high degree of remote control interaction during content viewing (e.g., content guide browsing or other browsing), the system 200 may display a higher percentage of advertisements on the output of the remote control device than on the primary output device.

As another example, if user remote control behavior analytics data indicates particular patterns of remote control activity (e.g., a user may frequently use the remote control during the first five minutes of viewing of a content item), advertisements may be displayed on the output device of the remote control in a manner corresponding to the detected pattern (e.g., if the user frequently uses the remote control during the first five minutes of content item viewing, advertisements may be displayed on the output device of the remote control during the first five minutes of content item viewing).

Figure 14:
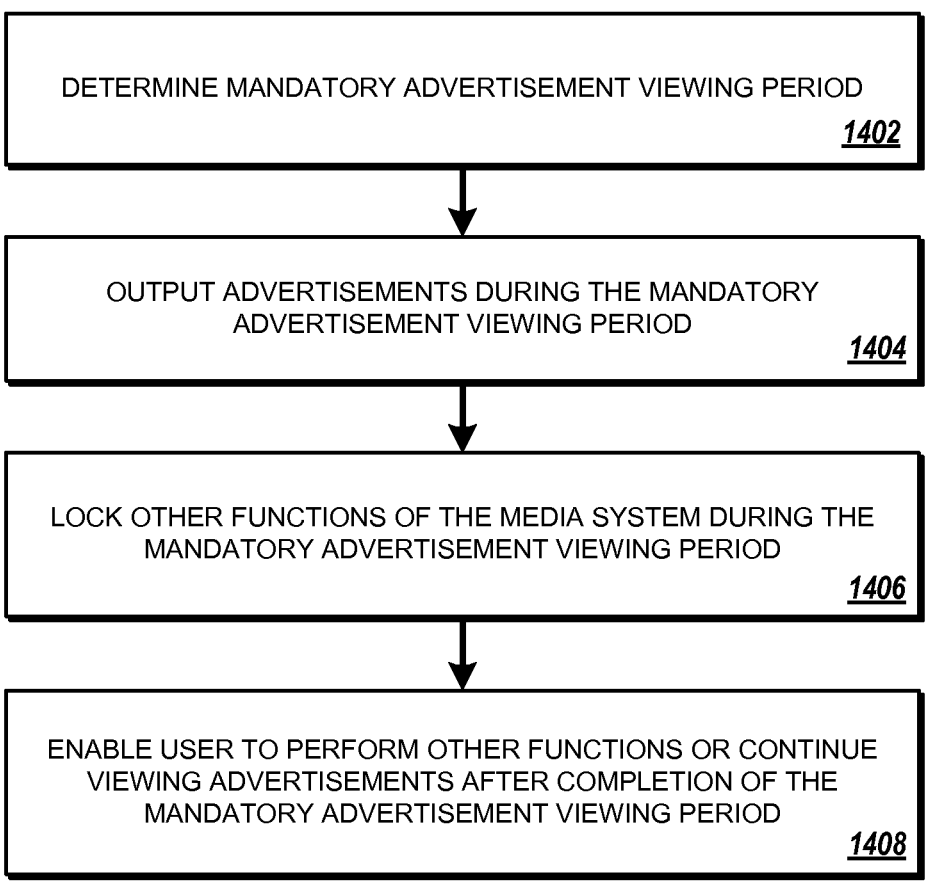

FIG. 14 illustrates an example process 1400 for outputting advertisements. The operations of the process 1400 are described generally as being performed by the system 200. The operations of the process 1400 may be performed by one of the components of the system 200 (e.g., the server system 210) or may be performed by a combination of the components of the system 200. In some implementations, operations of the process 1400 may be performed by one or more processors included in one or more electronic devices.

The system 200 determines a mandatory advertisement viewing period (1402). For example, the system 200 may determine a mandatory advertisement viewing period based on accessed user advertisement delivery preferences (e.g., in reference to FIG. 10). A mandatory advertisement viewing period may be a particular period (e.g., three minutes) of advertisement viewing shown in response to the elapsing of a particular period of time of content viewing (e.g., thirty minutes). The user may have selected to have advertisements delivered every certain number of minutes. As another example, the mandatory advertisement viewing period may be determined in response to a user switching to a different channel, if the user has configured advertisement delivery preferences to receive advertisements upon a channel change. As yet another example, the mandatory advertisement viewing period may be determined in response to a content file change on a channel (e.g., the ending of the playing of one content file and the beginning of a new content file on the current channel).

The mandatory advertisement viewing period time may be a fixed amount of time for each advertisement viewing period (e.g., three minutes each period) or may be a variable amount of time. For example, the length of the mandatory advertisement viewing period may be based on the amount of content viewing time since the last mandatory advertisement viewing period. If the user has selected to receive advertisements upon a channel change, the length of the mandatory advertisement viewing period may be based on the amount of time elapsed since the previous channel change. If the previous channel change was, for example, less than fifteen minutes ago, the mandatory advertisement viewing period may be, for example, one minute, and if the previous channel change was, for example, more than thirty minutes ago, the mandatory advertisement viewing period may be, for example, three minutes.

Similarly, if the user has configured to receive advertisements after a content file change, the length of the mandatory advertisement viewing period may be based on the length of the just-completed content file. For example, a mandatory advertisement viewing period occurring after completion of a two-hour content file may be, for example, five minutes, and a mandatory advertisement viewing period occurring after completion of a five minute content file may be, for example, thirty seconds.

The system 200 outputs advertisements during the mandatory advertisement viewing period (1404). For example, the system 200 may switch to and play an advertisement channel during the mandatory advertisement viewing period. A remote control or a media player/downloader device, for example, may switch to the advertisement channel. As another example, the system 200 may control the media system to deliver one or more advertisements selected from an advertisement repository.

The system 200 locks other functions of the media system during the mandatory advertisement viewing period (1406). For example, the user may be prevented from switching to a channel during the mandatory advertisement viewing period. In some implementations, the user may be allowed to switch to a different advertisement channel during the mandatory advertisement viewing period.

The system 200 enables the user to perform other functions or continue viewing advertisements after completion of the mandatory advertisement viewing period (1408). For example, if the user's advertisement delivery preferences are configured such that advertisements are delivered upon a channel change, the system 200 may automatically switch to the user-requested channel after completion of the mandatory advertisement viewing period. As another example, if the user's advertisement delivery preferences are configured such that advertisements are delivered upon a content file change, the system 200 may automatically switch to the next content file in the currently viewed channel upon completion of the mandatory advertisement viewing period.

Figure 15:
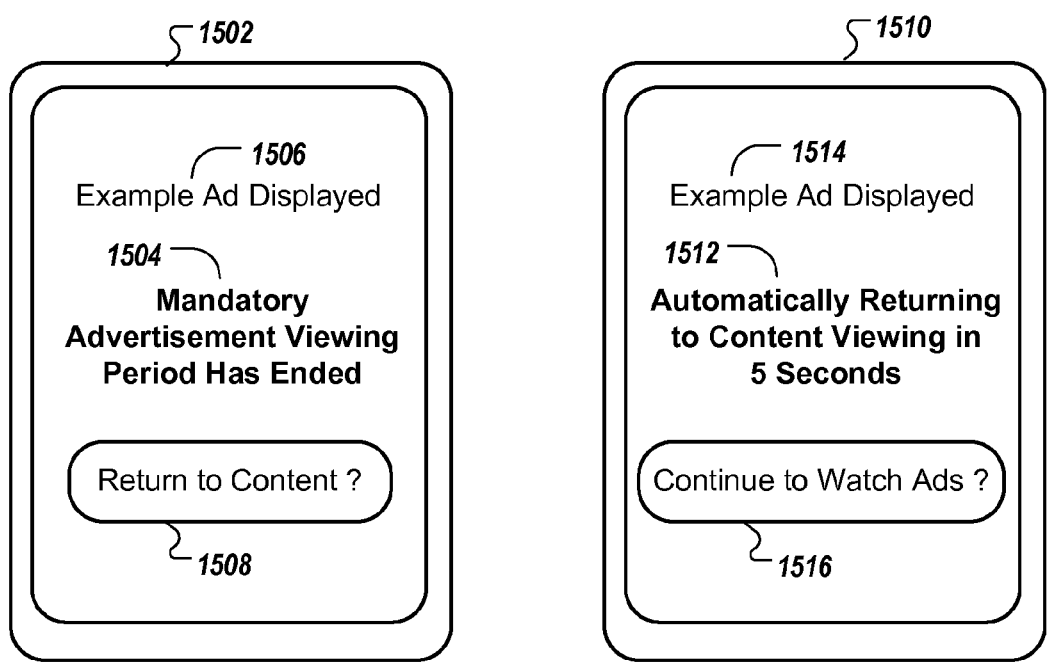

In some implementations, the system 200 may prompt the user upon completion of the mandatory advertisement viewing period. For example and as shown in FIG. 15, a user interface 1502 may be displayed. The user interface 1502 includes a message 1504 which may be overlaid on top of an advertisement 1506. The message 1504 indicates that the mandatory advertisement viewing period has ended. The user may select a control 1508 to return to content viewing. In some implementations, the user interface 1502 remains displayed until the user selects the control 1508. In other implementations, the user interface 1502 may be closed if there is no user response after a certain period of time (e.g., ten minutes) after the user interface 1502 is displayed. The user interface 1502 may be displayed on the display of a remote control device or on the primary display (e.g., television screen) of a media system.

As another example, a user interface 1510 may be displayed for a short period of time (e.g., five seconds) before completion of the mandatory advertisement viewing period. The user interface 1510 may be displayed, for example, on the display of a remote control device or on the primary display (e.g., television screen) of a media system. The user interface 1510 includes a message 1512 which may be overlaid on top of an advertisement 1514. The message 1512 indicates that the system 200 will be returning to content viewing in a short period of time (e.g., five seconds). The user may select a control 1516 to continue to watch ads. If the user does not select the control 1516, the system 200 may switch to a channel after the period of time indicated in the message 1512 elapses. If the user selects the control 1516, the system 200 may maintain selection of an advertisement channel, such as for a certain period of time (e.g., for another mandatory advertisement viewing period) or until the user manually switches to another channel. As another example, if the user selects the control 1516, one or more individual advertisements not included in an advertisement channel may be selected and displayed.

Figure 16:
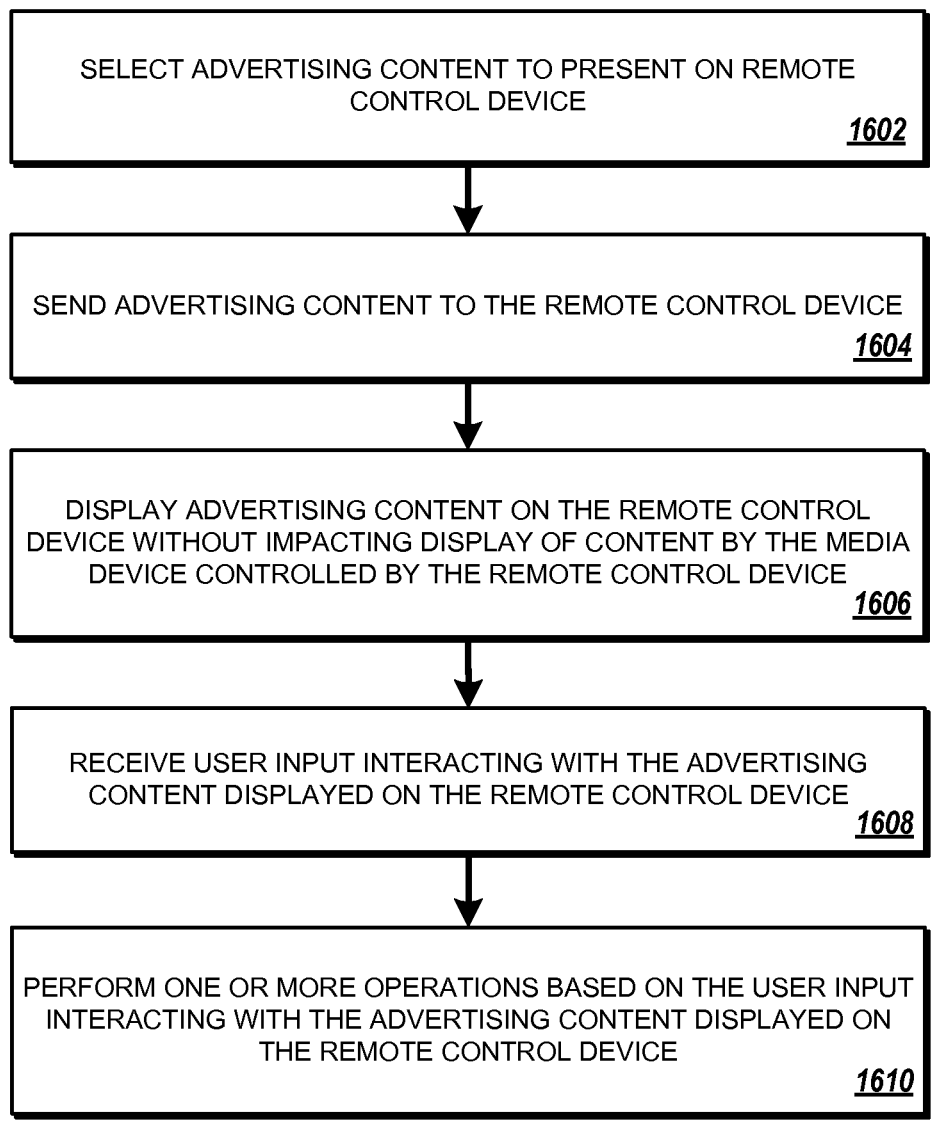

FIG. 16 illustrates an example process 1600 for responding to user interactions with displayed advertisements. The operations of the process 1600 are described generally as being performed by the system 200. The operations of the process 1600 may be performed by one of the components of the system 200 (e.g., the server system 210) or may be performed by a combination of the components of the system 200. In some implementations, operations of the process 1600 may be performed by one or more processors included in one or more electronic devices.

The system 200 selects advertising content to present on a remote control device (1602). For example, the system 200 may select a next advertisement on an advertisement channel. The advertisement channel may be a channel associated with multiple users or may be a user-specific advertisement channel. As another example, the system 200 may select an advertisement based on a category of content being viewed on the media system (e.g., if the user is watching sports content, a sports-related advertisement may be selected).

The system 200 sends advertising content to the remote control device (1604). For example, advertisement content may be sent from a media player/downloader device to the remote control device. As another example, advertisement content may be downloaded to the remote control device over a network. As yet another example, the system 200 may identify advertising content previously downloaded to and stored on the remote control device.

Figure 17:
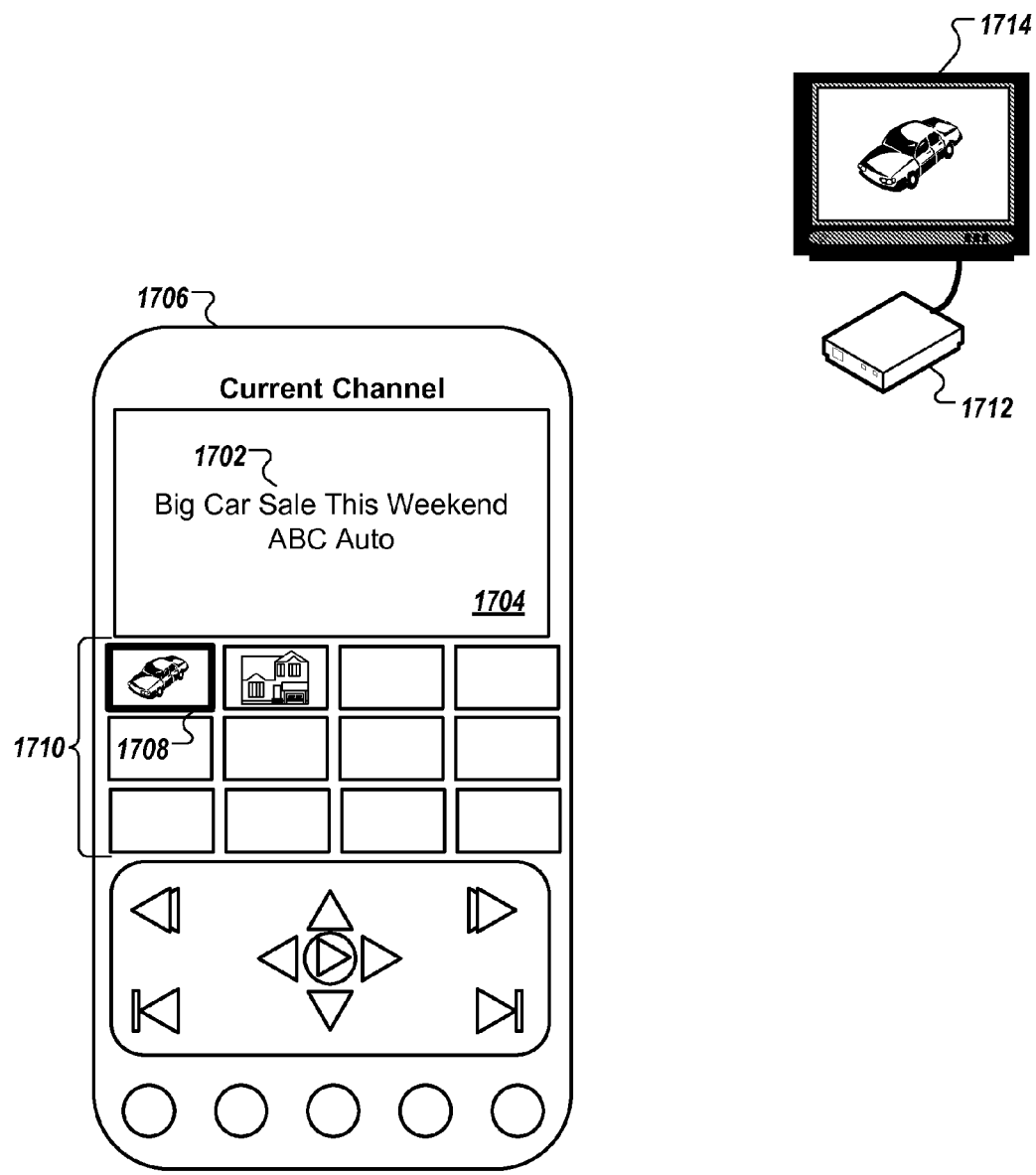

The system 200 displays advertising content on the remote control device without impacting display of content by the media device controlled by the remote control device (1606). For example and as shown in FIG. 17, an advertisement 1702 may be displayed in a display area 1704 of a remote control device 1706. The advertisement 1702 may be related to a content item represented by a representation 1708 displayed in a content guide 1710. The user may have selected the representation 1708 to play the content item (e.g., to direct a media player/downloader device 1712 to output the content item on a television screen 1714). The advertisement 1702 may be displayed in the display area 1704 without impacting display of the content item on the television screen 1714 (e.g., the display of the advertisement 1702 on the remote control device 1706 may occur without interrupting the output of the content item by the media player/downloader device 1712).

Figure 18:
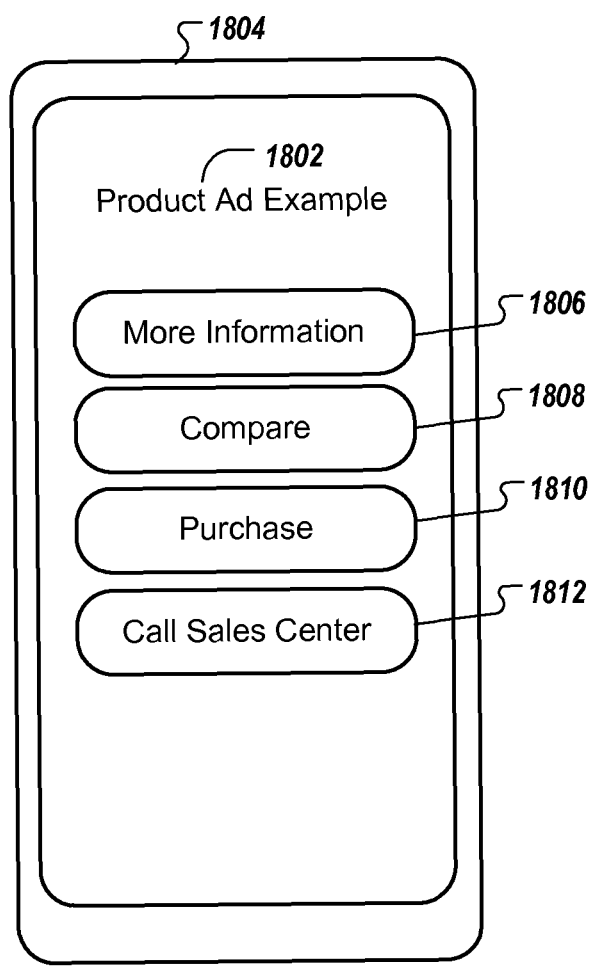

Returning to FIG. 16, the system 200 receives user input interacting with the advertising content displayed on the remote control device (1608). For example, the user may browse information related to the advertisement, compare a product featured in the advertisement to other products, purchase the product, or contact a sales person regarding the advertisement. As shown in FIG. 18, the user may interact with a product advertisement 1802 displayed on a remote control 1804 using one or more controls 1806, 1808, 1810, and 1812.

The user may select the control 1806 to see additional information about the product (e.g., product description, product features, reviews). The user may select the control 1808 to compare the product to other, related products. The user may select the control 1810 to purchase the product. For example, the user may use the remote control device 1804 to initiate an electronic transaction over a network, or, if the remote control device 1804 implements telephony features (e.g., using VoIP (Voice Over Internet Protocol) operating over a WiFi (Wireless Fidelity) network), the user may initiate a purchase by placing a telephone call. The user may contact a sales center by selecting the control 1812. The user may communicate with the sales center, for example, on a telephone call, through instant or text messages, or through electronic mail. As another example, subsequent to selection of the control 1812, the user may request that a sales associate call the user (e.g., call the user's remote control device, or another telephone associated with the user). A user's interactions with the controls 1806, 1808, 1810, and 1812 may be stored, in association with the user.

Figure 19:
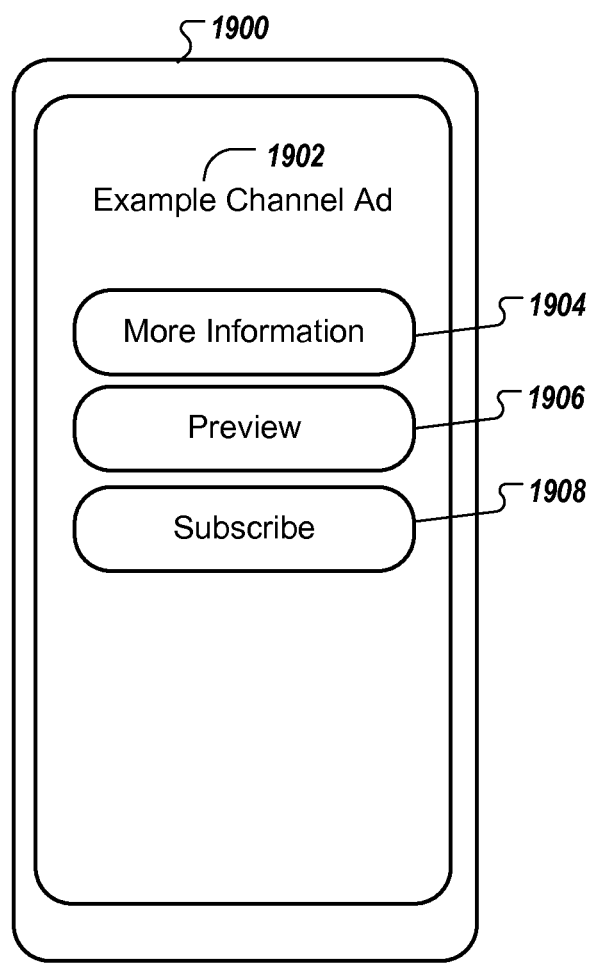

FIG. 19 illustrates a remote control device 1900 which is displaying an advertisement 1902 for a channel. For example, the advertisement 1902 may be promoting a channel defined by a particular content curator. The user may interact with the advertisement 1902 using controls 1904, 1906, and 1908. The user may select the control 1904 to see additional information about the advertised channel (e.g., a genre, a detailed description, example content thumbnails, user reviews). The user may select the control 1906 to preview the channel. For example, in response to the selection of the control 1906, preview content for the channel may be displayed, on the remote control device 1900 and/or on a primary display (e.g., television screen) of the media system. In some implementations, content for the advertised channel (e.g., either preview content or an actual content file included in the advertised channel) may be downloaded over a content delivery network to a media player/downloader device, a remote control device, or both. The user may select the control 1908 to subscribe to the advertised channel. In response to the channel subscription, content for the channel may be downloaded over a content delivery network. A user's interactions with the controls 1904, 1906, and 1908 may be stored, in association with the user.

Returning to FIG. 16, the system 200 performs one or more operations based on the user input interacting with the advertising content displayed on the remote control device (1610). For example, the system 200 may initiate an electronic transaction for a product purchase, may initiate a communication with a sales center, may play preview content for an advertised channel, may subscribe a user to an advertised channel, or may download content associated with a subscribed channel. Although the user interfaces 1800 and 1900 are described above as being displayed on a remote control device, the user interfaces 1800 and 1900 may also be displayed on a television screen and the transactions may be carried out using the television.

Figure 20:
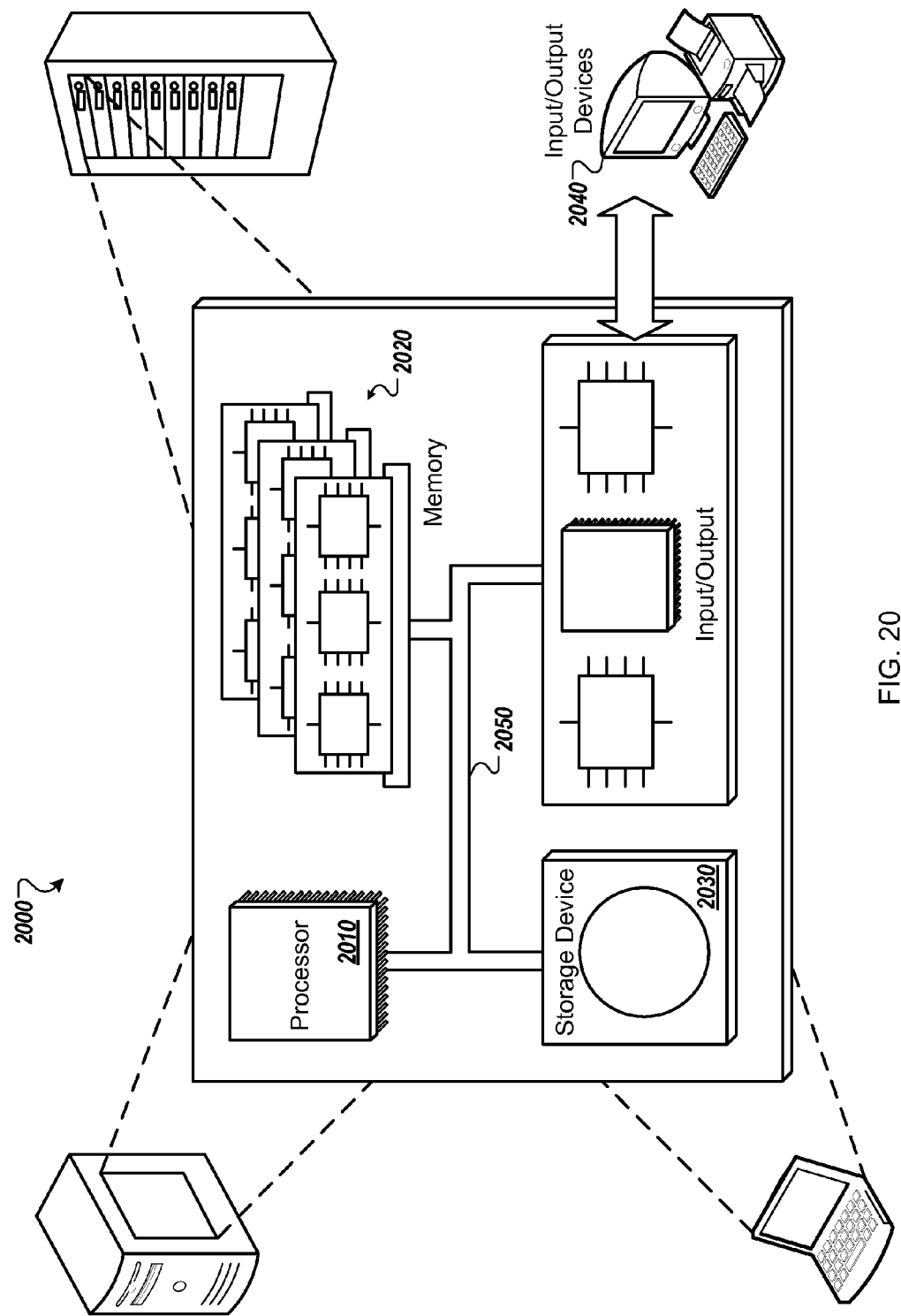

FIG. 20 is a schematic diagram of an example of a generic computer system 2000. The system 2000 can be used for the operations described in association with the processes 400, 500, 700, 1000, 1400, and 1600 according to one implementation. For example, the system 2000 may be included in either or all of the server system 210, the server 306, and the server 326.

The system 2000 includes a processor 2010, a memory 2020, a storage device 2030, and an input/output device 2040. Each of the components 2010, 2020, 2030, and 2040 are interconnected using a system bus 2050. The processor 2010 is capable of processing instructions for execution within the system 2000. In one implementation, the processor 2010 is a single-threaded processor. In another implementation, the processor 2010 is a multi-threaded processor. The processor 2010 is capable of processing instructions stored in the memory 2020 or on the storage device 2030 to display graphical information for a user interface on the input/output device 2040.

The memory 2020 stores information within the system 2000. In one implementation, the memory 2020 is a computer-readable medium. In one implementation, the memory 2020 is a volatile memory unit. In another implementation, the memory 2020 is a non-volatile memory unit.

The storage device 2030 is capable of providing mass storage for the system 2000. In one implementation, the storage device 2030 is a computer-readable medium. In various different implementations, the storage device 2030 may be a floppy disk device, a hard disk device, an optical disk device, or a tape device.

The input/output device 2040 provides input/output operations for the system 2000. In one implementation, the input/output device 2040 includes a keyboard and/or pointing device. In another implementation, the input/output device 2040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    receiving input related to viewing preferences of a user of a media system that is connected to a content delivery network;
    defining a control policy for the user of the media system based on the received input, the control policy defining a subset of channels made available on the content delivery network and a target percentage allocation for each channel in the subset of channels; and
    during viewing, on the media system, of a channel provided by the content delivery network, controlling the media system to deliver information based on the defined control policy, the controlling comprising:
        for each channel in the subset of channels, comparing a percentage of actual playback time on the media system to the target percentage allocation;
        based on comparison results, selecting, from among the subset of channels, a channel from which to deliver information; and
    controlling the media system to deliver information from the selected channel.

2. The method of claim 1:
    wherein receiving input related to viewing preferences of the user of the media system comprises:
        displaying channel information for channels made available on the content delivery network, and
        receiving, from the user of the media system, selection of a subset of the displayed channels made available on the content delivery network;
    wherein defining the control policy for the user of the media system based on the received input comprises defining a control policy based on the subset of channels; and
    wherein controlling the media system to deliver information based on the defined control policy comprises, when content is needed on the media system, controlling the media system to deliver information from the subset of channels.

3. The method of claim 2:
    wherein receiving input related to viewing preferences of the user of the media system further comprises receiving input identifying the target percentage allocation for each channel included in the subset of channels, the target percentage allocation defining a percentage of time the corresponding channel is used to deliver information;
    wherein defining the control policy for the user of the media system based on the received input further comprises defining a control policy based on the target percentage allocation for each channel included in the subset of channels; and
    wherein controlling the media system to deliver information from the subset of channels comprises controlling the media system to deliver information from the subset of channels in accordance with the target percentage allocation for each channel included in the subset of channels.

4. The method of claim 1:
    wherein receiving input related to viewing preferences of the user of the media system comprises accessing at least one of targeting data related to preferred information selection for the user of the media system and media system behavior analytics data for the user of the media system;
    wherein defining the control policy for the user of the media system based on the received input comprises:
        automatically identifying, without intervention of the user of the media system, a channel for the user of the media system based on at least one of the targeting data and the media system behavior analytics data, and
        defining a control policy based on the identified channel; and
    wherein controlling the media system to deliver information based on the defined control policy comprises, when information is needed on the media system, controlling the media system to deliver information from the identified channel.

5. The method of claim 4:
    wherein accessing at least one of targeting data related to preferred information selection for the user of the media system and media system behavior analytics data for the user of the media system comprises accessing targeting data related to preferred information selection for the user of the media system; and
    wherein automatically identifying the channel for the user of the media system based on at least one of the targeting data and the media system behavior analytics data comprises automatically identifying the channel for the user of the media system based on the targeting data.

6. The method of claim 4:
    wherein accessing at least one of targeting data related to preferred information selection for the user of the media system and media system behavior analytics data for the user of the media system comprises accessing media system behavior analytics data for the user of the media system; and wherein automatically identifying the channel for the user of the media system based on at least one of the targeting data and the media system behavior analytics data comprises automatically identifying the channel for the user of the media system based on the media system behavior analytics data;

wherein accessing media system behavior analytics data for the user of the media system comprises accessing information behavior analytics data for the user of the media system, the information behavior analytics data describing information viewing behavior of the user of the media system and remote control activity of the user of the media system during display of information; and wherein automatically identifying the channel for the user of the media system based on the media system behavior analytics data comprises automatically identifying information to display to the user of the media system based on the information behavior analytics data.

7. The method of claim 4 wherein automatically identifying the channel for the user of the media system based on at least one of the targeting data and the media system behavior analytics data comprises:

identifying information for the user of the media system based on at least one of the targeting data and the media system behavior analytics; and defining a user-specific channel for the user of the media system that includes the information identified based on at least one of the targeting data and the media system behavior analytics.

8. The method of claim 1:

wherein receiving input related to viewing preferences of the user of the media system comprises receiving input related to information delivery preferences of the user of the media system;

wherein defining the control policy for the user of the media system based on the received input comprises:
determining one or more rules for controlling information delivery based on the information delivery preferences, and
defining the control policy based on the one or more information delivery rules;

wherein controlling the media system to deliver information based on the defined control policy comprises controlling the media system to deliver information based on the one or more information delivery rules;

wherein receiving input related to information delivery preferences of the user of the media system comprises receiving a selection, from among options (1) to repeatedly receive information after a particular period of time of content viewing on the media system, (2) to repeatedly receive information upon change of a channel being output by the media system, and (3) to repeatedly receive information upon change of a content file being output by the media system;

wherein determining one or more rules for controlling information delivery based on the information delivery preferences comprises determining a rule to repeatedly deliver information after a particular period of time of content viewing on the media system; and wherein controlling the media system to deliver information based on the one or more information delivery rules comprises:
monitoring for completion of the particular period of time of content viewing on the media system; and
repeatedly delivering information upon detecting completion of the particular period of time of content viewing on the media system.

9. The method of claim 1:

wherein receiving input related to viewing preferences of the user of the media system comprises receiving input related to information delivery preferences of the user of the media system;

wherein defining the control policy for the user of the media system based on the received input comprises:
determining one or more rules for controlling information delivery based on the information delivery preferences, and
defining the control policy based on the one or more information delivery rules;

wherein controlling the media system to deliver content based on the defined control policy comprises controlling the media system to deliver information based on the one or more information delivery rules;

wherein receiving input related to information delivery preferences of the user of the media system comprises receiving a selection, from among options (1) to repeatedly receive information after a particular period of time of content viewing on the media system, (2) to repeatedly receive information upon change of a channel being output by the media system, and (3) to repeatedly receive information upon change of a content file being output by the media system;

wherein determining one or more rules for controlling information delivery based on the information delivery preferences comprises determining a rule to repeatedly deliver information upon change of a channel being output by the media system; and wherein controlling the media system to deliver information based on the one or more information delivery rules comprises:
monitoring for change of a channel being output by the media system; and
repeatedly delivering information upon detecting change of a channel being output by the media system.

10. The method of claim 1:

wherein receiving input related to viewing preferences of the user of the media system comprises receiving input related to information delivery preferences of the user of the media system;

wherein defining the control policy for the user of the media system based on the received input comprises:
determining one or more rules for controlling information delivery based on the information delivery preferences, and
defining the control policy based on the one or more information delivery rules;

wherein controlling the media system to deliver information based on the defined control policy comprises controlling the media system to deliver information based on the one or more information delivery rules;

wherein receiving input related to information delivery preferences of the user of the media system comprises receiving a selection, from among options (1) to repeatedly receive information after a particular period of time of content viewing on the media system, (2) to repeatedly receive information upon change of a channel being output by the media system, and (3) to repeatedly receive information upon change of a content file being output by the media system;

wherein determining one or more rules for controlling information delivery based on the information delivery preferences comprises determining a rule to repeatedly deliver information upon change of a content file being output by the media system; and wherein controlling the media system to deliver information, based on the one or more information delivery rules comprises:

monitoring for change of a content file being output by the media system; and repeatedly delivering information upon detecting change of a content file being output by the media system.

11. The method of claim 1:

wherein receiving input related to viewing preferences of the user of the media system comprises receiving input related to information delivery preferences of the user of the media system;

wherein defining the control policy for the user of the media system based on the received input comprises:

determining one or more rules for controlling information delivery based on the information delivery preferences, and defining the control policy based on the one or more information delivery rules;

wherein controlling the media system to deliver information based on the defined control policy comprises controlling the media system to deliver information based on the one or more information delivery rules;

wherein receiving input related to information delivery preferences of the user of the media system comprises receiving input defining whether information should be output on a primary output device of the media system, output on an output device of a remote control of the media system, or output on both the primary output device of the media system and the output device of the remote control of the media system;

wherein determining one or more rules for controlling information delivery based on the information delivery preferences comprises:

determining a first rule to output information on the primary output device of the media system in response to receiving input defining that information should be output on the primary output device of the media system, determining a second rule to output information on the output device of the remote control of the media system in response to receiving input defining that information should be output on the output device of the remote control of the media system, and determining a third rule to output information on both the primary output device of the media system and the output device of the remote control of the media system in response to receiving input defining that information should be output on both the primary output device of the media system and the output device of the remote control of the media system; and wherein controlling the media system to deliver information based on the one or more information delivery rules comprises:

controlling the media system to deliver information using the primary output device of the media system in response to determining the first rule, controlling the media system to deliver information using the output device of the remote control of the media system in response to determining the second rule, and controlling the media system to deliver information using both the primary output device of the media system and the output device of the remote control of the media system in response to determining the third rule.

12. The method of claim 1 further comprising:

determining a mandatory information viewing period;

controlling the media system to output information during the mandatory information viewing period;

controlling the media system to lock other functions of the media system during the mandatory information viewing period; and enabling the user of the media system to perform other functions of the media system or continue receiving information after completion of the mandatory information viewing period.

13. The method of claim 12 wherein enabling the user of the media system to perform other functions of the media system or continue receiving information after completion of the mandatory information viewing period comprises:

detecting that the mandatory information viewing period has completed; and in response to detecting that the mandatory information viewing period has completed:

outputting an indication that the mandatory information viewing period has completed while continuing to output information; and enabling the user of the media system to provide input to return to viewing, on the media system, the channel provided by the content delivery network.

14. The method of claim 12 wherein enabling the user of the media system to perform other functions of the media system or continue receiving information after completion of the mandatory information viewing period comprises:

detecting that the mandatory information viewing period will complete within a particular amount of time; and in response to detecting that the mandatory information viewing period will complete within the particular amount of time:

outputting an indication that the mandatory information viewing period will complete within the particular amount of time while continuing to output information;

enabling the user of the media system to provide input to continue receiving information after completion of the mandatory information viewing period;

when input is received to continue receiving information prior to completion of the mandatory information viewing period, continuing to output information without automatically returning to the channel provided by the content delivery network at the completion of the mandatory information viewing period; and when input is not received to continue receiving information prior to completion of the mandatory information viewing period, automatically, without intervention of the user of the media system, returning to the channel provided by the content delivery network at the completion of the mandatory information viewing period.

15. The method of claim 1 further comprising:

Selecting information to present on a remote control device that is included in the media system and that controls a media device included in the media system;

sending the selected information to the remote control device; and displaying the selected information on a display of the remote control device without impacting display of content output by the media device controlled by the remote control device.

16. The method of claim 15 wherein selecting information to present on the remote control device comprises selecting information to present on the remote control device based on content concurrently being output by the media device controlled by the remote control device.

17. The method of claim 15 further comprising:
receiving user input interacting with the information displayed on the remote control device; and
performing one or more operations based on the user input interacting with the information displayed on the remote control device.

18. The method of claim 1 further comprising:
controlling a voice over internet protocol module included in a remote control device to establish a telephone call based on information being delivered by the media system, the remote control device being included in the media system and being configured to control a media device included in the media system.

19. The method of claim 18 wherein controlling the voice over internet protocol module included in the remote control device to establish the telephone call based on the information being delivered by the media system comprises controlling the voice over internet protocol module included in the remote control device to place a telephone call to a representative of a company that provided the information being delivered by the media system.

20. The method of claim 18 wherein controlling the voice over internet protocol module included in the remote control device to establish the telephone call based on the information being delivered by the media system comprises controlling the voice over internet protocol module included in the remote control device to receive a telephone call from a representative of a company that provided the information being delivered by the media system.

21. The method of claim 1 further comprising:
maintaining an expiration attribute for information eligible for delivery by the media system, the expiration attribute defining a time when the information expires and is no longer eligible for delivery by the media system;
determining that the information has expired based on the expiration attribute; and
in response to determining that the information has expired, preventing the information from being served by the media system and causing deletion of the information from electronic storage included in the media system to the extent the information has been stored in electronic storage included in the media system.

22. The method of claim 1 wherein controlling the media system to deliver information based on the defined control policy comprises causing information to be streamed to the media system.

23. The method of claim 1 wherein controlling the media system to deliver information based on the defined control policy comprises causing information to be pre-downloaded to electronic storage of the media system in advance of a time when the information is to be presented and, at the time when the information is to be presented, presenting the information pre-downloaded to electronic storage of the media system.

24. A system comprising:
at least one computer; and
at least one computer-readable medium coupled to the at least one computer having instructions stored thereon which, when executed by the at least one computer, causes the at least one computer to perform operations comprising:
receiving input related to viewing preferences of a user of a media system that is connected to a content delivery network;
defining a control policy for the user of the media system based on the received input; and
during viewing, on the media system, of a channel provided by the content delivery network, controlling the media system to deliver information based on the defined control policy, the controlling comprising:
for each channel in the subset of channels, comparing a percentage of actual playback time on the media system to the target percentage allocation;
based on comparison results, selecting, from among the subset of channels, a channel from which to deliver information; and
controlling the media system to deliver information from the selected channel.

25. At least one computer-readable storage device encoded with at least one computer program comprising instructions that, when executed, operate to cause a processor to perform operations comprising:
receiving input related to viewing preferences of a user of a media system that is connected to a content delivery network;
defining a control policy for the user of the media system based on the received input; and
during viewing, on the media system, of a channel provided by the content delivery network, controlling the media system to deliver information based on the defined control policy, the controlling comprising:
for each channel in the subset of channels, comparing a percentage of actual playback time on the media system to the target percentage allocation;
based on comparison results, selecting, from among the subset of channels, a channel from which to deliver information; and
controlling the media system to deliver information from the selected channel.

26. The method of claim 1, wherein, for each channel in the subset of channels, comparing a percentage of actual playback time on the media system to the target percentage allocation comprises calculating a difference between the percentage of actual playback time on the media system and the target percentage allocation.

27. The method of claim 26, wherein selecting, from among the subset of channels, a channel from which to deliver information comprises selecting a channel for which the target percentage allocation minus the percentage of actual playback time on the media system is maximal.

* * * * *